(12) United States Patent
Kawada et al.

(10) Patent No.: US 7,190,728 B2
(45) Date of Patent: *Mar. 13, 2007

(54) DIGITAL DATA TRANSMITTER, TRANSMISSION LINE ENCODING METHOD, AND DECODING METHOD

(75) Inventors: Hirotsugu Kawada, Sakai (JP); Yuji Mizuguchi, Hirakata (JP); Takahisa Sakai, Amagasaki (JP); Noboru Katta, Itami (JP); Toshihiko Kurosaki, Kobe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 415 days.

This patent is subject to a terminal disclaimer.

(21) Appl. No.: 10/398,447

(22) PCT Filed: Oct. 5, 2001

(86) PCT No.: PCT/JP01/08787

§ 371 (c)(1),
(2), (4) Date: Apr. 4, 2003

(87) PCT Pub. No.: WO02/30075

PCT Pub. Date: Apr. 11, 2002

(65) Prior Publication Data
US 2004/0042555 A1    Mar. 4, 2004

(30) Foreign Application Priority Data

Oct. 5, 2000 (JP) ............................. 2000-305821
Mar. 6, 2001 (JP) ............................. 2001-061322
Mar. 6, 2001 (JP) ............................. 2001-061323

(51) Int. Cl.
*H04L 27/00* (2006.01)

(52) U.S. Cl. ........................ 375/259; 375/295; 375/316

(58) Field of Classification Search ................ 375/261, 375/298, 316, 295, 346, 345, 371, 376, 231, 375/358, 369, 259; 370/84, 85.3, 110.1, 370/110.4, 85.11, 286, 289; 455/232.1, 234.1
See application file for complete search history.

(56) References Cited

U.S. PATENT DOCUMENTS 4,028,667 A    6/1977 Breslau et al.

(Continued)

FOREIGN PATENT DOCUMENTS

EP    0 450 879    10/1991

(Continued)

OTHER PUBLICATIONS

Oscar Agazzi, et al., "An Analog Front End for Full-Duplex Digital Transceivers Working on Twisted Pairs", IEEE Journal of Solid-State Circuits, vol. 24, No. 2, pp. 229-240, Apr. 1989.

*Primary Examiner*—Emmanuel Bayard
(74) *Attorney, Agent, or Firm*—Wenderoth, Lind & Ponack, L.L.P.

(57) ABSTRACT

A digital data transmission apparatus includes a transmitting end (100) that includes: a binary/quadrary conversion unit (110) for converting a data stream; a coding unit (120) for mapping the converted data to be coded; a digital filter (130); a D/A conversion unit (140); a low-pass filter (150) for eliminating a high-band signal; a differential driver (160) for inputting an analog signal that has passed through the low-pass filter into a twisted pair cable (300), and a receiving end (200) that includes: a low-pass filter (210) for eliminating noises from both wires of the twisted pair cable; a receiver (220) for receiving the signals that have passed through the low-pass filter; an A/D conversion unit (230); a digital filter (240); an evaluation unit (250) for evaluating a signal level of a received signal; a decoding unit (260) for decoding the signal level into receipt data; and a synchronization unit (270) for generating a clock.

43 Claims, 23 Drawing Sheets

U.S. PATENT DOCUMENTS

| | | | |
|---|---|---|---|
| 4,083,005 A | | 4/1978 | Looschen |
| 4,547,879 A | | 10/1985 | Hamelin et al. |
| 4,769,839 A | | 9/1988 | Preineder et al. |
| 4,924,492 A | * | 5/1990 | Gitlin et al. ............. 379/93.08 |
| 4,982,185 A | | 1/1991 | Holmberg et al. |
| 5,052,021 A | | 9/1991 | Goto et al. |
| 5,206,857 A | | 4/1993 | Farleigh |
| 5,297,163 A | * | 3/1994 | Pfeiffer ...................... 375/222 |
| 5,301,185 A | | 4/1994 | Cherry |
| 5,303,265 A | | 4/1994 | McLean |
| 5,812,594 A | * | 9/1998 | Rakib ......................... 375/219 |
| 5,850,441 A | | 12/1998 | Townsend et al. |
| 6,157,680 A | * | 12/2000 | Betts et al. ................. 375/285 |
| 6,421,323 B1 | | 7/2002 | Nelson et al. |
| 6,545,532 B1 | | 4/2003 | Maalej et al. |
| 2002/0106037 A1 | | 8/2002 | Gara |
| 2004/0028145 A1 | * | 2/2004 | Katta et al. ................. 375/257 |

FOREIGN PATENT DOCUMENTS

| | | |
|---|---|---|
| EP | 0 490 504 | 6/1992 |
| EP | 0 511 786 | 11/1992 |
| JP | 55-38633 | 3/1980 |
| JP | 63-110840 | 5/1988 |
| JP | 2-19049 | 1/1990 |
| JP | 2-186710 | 7/1990 |
| JP | 2-281851 | 11/1990 |
| JP | 3-195144 | 8/1991 |
| JP | 5-14419 | 1/1993 |
| JP | 6-29987 | 2/1994 |
| JP | 7-50683 | 2/1995 |
| JP | 7-93909 | 4/1995 |
| JP | 8-125579 | 5/1996 |
| JP | 8-181722 | 7/1996 |
| JP | 9-148936 | 6/1997 |
| JP | 11-154205 | 6/1999 |
| JP | 11-341083 | 12/1999 |
| JP | 2000-049764 | 2/2000 |
| JP | 2000-134269 | 5/2000 |
| JP | 2000-224148 | 8/2000 |

OTHER PUBLICATIONS

Clayton: "Introduction to Electromagnetic Compatibility" 1992, chapters 8 and 13, John Wiley & Sons, New York, US, XP002279634.

Webb, W.T. et al. "Bandwidth efficient QAM schemes for Rayleigh fading channels," IEE Proceedings-1, vol. 138, No. 3, Jun. 1991.

* cited by examiner

| set value \ previous value | 0 | 1 | 2 | 3 | 4 |
|---|---|---|---|---|---|
| 0 |  | 01 | 01 | 01 | 01 |
| 1 | 01 |  | 11 | 11 | 11 |
| 2 | 11 | 11 |  | 00 | 00 |
| 3 | 00 | 00 | 00 |  | 10 |
| 4 | 10 | 10 | 10 | 10 |  |

| set value \ previous value | 0 | 1 | 2 | 3 | 4 |
|---|---|---|---|---|---|
| 0 |  | 01 | 01 | 01 | 01 |
| 1 | 01 |  | 11 | 11 | 11 |
| 2 | 11 | 11 |  | 00 | 00 |
| 3 | 00 | 00 | 00 |  | 10 |
| 4 | 10 | 10 | 10 | 10 |  | waveform subjected to band limitation by digital filter frequency band in which electromagnetic waves do not cancel each other out and are emitted even when opposite phase signals are inputted through twisted pair cable

| set value \ previous value | 0 | 1 | 2 | 3 | 4 |
|---|---|---|---|---|---|
| 0 |  | (01) | 01 | 01 | 01 |
| 1 | (01) |  | 11 | [11] | [11] |
| 2 | 11 | 11 |  | 00 | 00 |
| 3 | [00] | [00] | 00 |  | (10) |
| 4 | 10 | 10 | 10 | (10) |  |

| set value \ previous value | 0 | 1 | 2 | 3 | 4 |
|---|---|---|---|---|---|
| 0 |  | 10 | 00 | 11 | 01 |
| 1 | 01 |  | 10 | 00 | 11 |
| 2 | 11 | 01 |  | 10 | 00 |
| 3 | 00 | 11 | 01 |  | 10 |
| 4 | 10 | 00 | 11 | 01 |  |

| previous signal level \ received symbol | 10 | 11 | 01 | 00 |
|---|---|---|---|---|
| +7 | -3 | -5 | -7 | -1 |
| +5 | -5 | -7 | -1 | -3 |
| +3 | -7 | -1 | -3 | -5 |
| +1 | -1 | -3 | -5 | -7 |
| -1 | +5 | +3 | +1 | +7 |
| -3 | +3 | +1 | +7 | +5 |
| -5 | +1 | +7 | +5 | +3 |
| -7 | +7 | +5 | +3 | +1 |
| difference from previous value | -2<br>-10<br>+6<br>+14 | -4<br>-12<br>+4<br>+12 | -6<br>-14<br>+2<br>+10 | -8<br>+8 |

Fig.16

| n-th symbol | (n+1)-th symbol | (n+2)-th symbol | (n+3)-th symbol | (n+4)-th symbol | (n+5)-th symbol | (n+6)-th symbol |
|---|---|---|---|---|---|---|
| 00 | 10 | 11 | 01 | 11 | 01 | 10 |

Fig.20

| Threshold | threshold 1 | threshold 2 | threshold 3 | threshold 4 | threshold 5 | threshold 6 | threshold 7 | threshold 8 | threshold 9 | threshold 10 | threshold 11 | threshold 12 | threshold 13 |
|---|---|---|---|---|---|---|---|---|---|---|---|---|---|
| Voltage | -26 | -22 | -18 | -14 | -10 | -6 | 0 | 6 | 10 | 14 | 18 | 22 | 26 |

Fig.21

| Difference between voltage received in previous signal timing and voltage received in present signal timing | under threshold 1 | no smaller than threshold 1 and smaller than threshold 2 | no smaller than threshold 2 and smaller than threshold 3 | no smaller than threshold 3 and smaller than threshold 4 | no smaller than threshold 4 and smaller than threshold 5 | no smaller than threshold 5 and smaller than threshold 6 | no smaller than threshold 6 and smaller than threshold 7 |
|---|---|---|---|---|---|---|---|
| corresponding number of difference levels | -7 level | -6 level | -5 level | -4 level | -3 level | -2 level | -1 level |

| Difference between voltage received in previous signal timing and voltage received in present signal timing | no smaller than threshold 7 and smaller than threshold 8 | no smaller than threshold 8 and smaller than threshold 9 | no smaller than threshold 9 and smaller than threshold 10 | no smaller than threshold 10 and smaller than threshold 11 | no smaller than threshold 11 and smaller than threshold 12 | no smaller than threshold 12 and smaller than threshold 13 | no smaller than threshold 13 |
|---|---|---|---|---|---|---|---|
| corresponding number of difference levels | +1 level | +2 level | +3 level | +4 level | +5 level | +6 level | +7 level |

Fig.22

| number of difference levels | -7 level | -6 level | -5 level | -4 level | -3 level | -2 level | -1 level |
|---|---|---|---|---|---|---|---|
| corresponding symbol value | 01 | 11 | 10 | 00 | 01 | 11 | 10 |

| number of difference levels | +1 level | +2 level | +3 level | +4 level | +5 level | +6 level | +7 level |
|---|---|---|---|---|---|---|---|
| corresponding symbol value | 01 | 11 | 10 | 00 | 01 | 11 | 10 |

Fig.23

| previous signal level | receipt symbol | 10 | 11 | 01 | 00 |
|---|---|---|---|---|---|
| +5 | even-numbered cycle | -1 | -3 | -5 | +1 |
| | odd-numbered cycle | | | | |
| +3 | even-numbered cycle | -3 | -5 | +1 | -1 |
| | odd-numbered cycle | | | | |
| +1 | even-numbered cycle | -5 | +1 | -1 | -3 |
| | odd-numbered cycle | +3 | +1 | -1 | +5 |
| -1 | even-numbered cycle | +1 | -1 | -3 | -5 |
| | odd-numbered cycle | +1 | -1 | +5 | +3 |
| -3 | even-numbered cycle | | | | |
| | odd-numbered cycle | -1 | +5 | +3 | +1 |
| -5 | even-numbered cycle | | | | |
| | odd-numbered cycle | +5 | +3 | +1 | -1 |

| difference from previous value | -6 +2 +10 | -8 0 +8 | -10 -2 +6 | -4 +4 |

Fig.24

| previous signal level \ received symbol | 10 | 11 | 01 | 00 |
|---|---|---|---|---|
| +7 | -3 | -1 | -5 | -7 |
| +5 | -3 | -1 | -5 | -7 |
| +3 | -3 | -1 | -5 | -7 |
| +1 | -3 | -1 | -5 | -7 |
| -1 | +5 | +7 | +3 | +1 |
| -3 | +5 | +7 | +3 | +1 |
| -5 | +5 | +7 | +3 | +1 |
| -7 | +5 | +7 | +3 | +1 |

Fig.25

| previous signal level | received symbol | 10 | 11 | 01 | 00 |
|---|---|---|---|---|---|
| +5 | even-numbered cycle | -1 | +1 | -3 | -5 |
| | odd-numbered cycle | | | | |
| +3 | even-numbered cycle | +1 | +1 | -3 | -5 |
| | odd-numbered cycle | | | | |
| +1 | even-numbered cycle | -1 | +1 | -3 | -5 |
| | odd-numbered cycle | +3 | +5 | +1 | -1 |
| -1 | even-numbered cycle | -1 | +1 | -3 | -5 |
| | odd-numbered cycle | +3 | +5 | +1 | -1 |
| -3 | even-numbered cycle | | | | |
| | odd-numbered cycle | +3 | +5 | +1 | -1 |
| -5 | even-numbered cycle | | | | |
| | odd-numbered cycle | +3 | +5 | +1 | -1 | at 8-value mapping at 5-value mapping

|  | preceding symbol : 0 | preceding symbol : 1 |
|---|---|---|
| data : 0 | 10 | 01 |
| data : 1 | 11 | 00 |

DIGITAL DATA TRANSMITTER, TRANSMISSION LINE ENCODING METHOD, AND DECODING METHOD

TECHNICAL FIELD

The present invention relates to a digital data transmission apparatus, and a transmission channel coding method and decoding method and, more particularly, to a digital data transmission apparatus that reduces emission of noises by a digital filter, and a transmission channel coding method and decoding method by which successive coded data do not have the same value also at multi-valued transmission.

BACKGROUND ART

Some conventional data transmission apparatuses convert digital data into signal levels of electric signals or optical signals, to be transmitted. The transmission rates have been increased through the years and, recently, some apparatuses transmit large amounts of data, such as video signals, at transmission rates of several tens of megabits/sec. The frequencies of these signals are so high that emitted noises cause large problems when these signals are transmitted through copper wires or the like.

For example, when such apparatus is mounted on a motor vehicle or the like, emitted noises may cause malfunctions of other electronic gear that is mounted on the motor vehicle. Accordingly, there is a need to make the apparatus hardly emit noises when mounted on the vehicles. It is also required that the apparatus can transmit data correctly without being affected by noises emitted from other equipment. Similarly, factory automation machinery or precision machines such as medical devices also require reduction in noise emission and resistance to noise.

The conventional data transmission apparatuses utilize a method in which optical fiber cables are employed in place of the copper wires, so as to emit no electromagnetic waves. When the copper wires are employed, the voltage of a transmission signal is suppressed at a lower level to reduce emission of noises. There is also employed a method in which a transmission cable for transmitting signals is covered with another shielded wire to prevent the emitted noises from leaking outside. In the case of low-speed signal transmission, a transmission cable such as a twisted pair cable that is obtained by twisting two transmission wires is employed, and signals having opposite polarities are passed through the respective wires, so that the signals cancel each other out, whereby noises are hardly emitted outside. The twisted pair cable has the advantage in having a simple structure and it can be manufactured without great difficulty and accordingly at a reduced cost, while noise emission cannot be reduced satisfactorily at high-speed transmission.

In addition, the digital transmission requires communications with higher reliability. One of factors that reduce the reliability in the digital transmission is that when the transmission signal constantly take the same signal level, synchronization of symbol timing cannot be established at the receiving end.

Conventionally, in order to improve the reliability of receipt, the transmission signal has been processed so that it does not keep on taking the same level. One of the methods for processing the transmission signal is scrambling. The scrambling is a method by which random numbers are added to digital data to be transmitted, thereby to prevent the transmission signal from successively taking the same signal level even when digital data to be transmitted successively take the same value. In the case of binary transmission in which data are transmitted by two values, the data are coded according to the bi-phase mark method, thereby to prevent the same signal level from successively appearing.

The bi-phase mark coding method is employed as a standard transmission method when digital data of audio data are transmitted. FIG. 33 is a diagram for explaining the bi-phase mark coding method. According to the bi-phase mark coding method, depending on whether the immediately preceding symbol is 1 or 0, the next data to be transmitted is coded differently, thereby converting 1-bit data to be transmitted into a 2-bit symbol. Accordingly, a signal sequence that is coded as shown in FIG. 33 is assured that it never takes the same signal level successively three or more times. Thus, the symbol timing of the transmitted data can be detected on the receiving end, whereby the data can be reproduced correctly.

The data transmission apparatus employing optical fibers emits no noise, while it requires expensive elements such as light-to-electricity converters or fiber couplers with less optical loss. In addition, the optical fiber has a problem in its strength, such as limitation in the bend angle of the cable, so that the application range thereof is limited.

Further, according to the method in which the copper signal cable is covered with a shielded wire, some noises are eliminated by the shielding effect, while the shielded wire between the transmitting and receiving ends must be grounded sufficiently to provide effective shielding, and the prices of connectors, cables, or the like for that purpose get higher.

Furthermore, according to the method by which signals having opposite polarities are passed through a twisted pair cable, when the signals to be transmitted include higher frequency components, the signals which are passed through two transmission wires of the cable do not always cancel each other out due to slight asymmetry between the two transmission wires, whereby noises occur unfavorably, so that a sufficient reduction in noises cannot be obtained in the case of high-speed data transmission.

Thus, the digital signal to be transmitted is conventionally converted into a rectangular-wave signal having the corresponding signal level, and then higher frequency components are eliminated by means of a low-pass filter utilizing a resistor, a coil, a capacitor, or the like, thereby to reduce noises. However, it is difficult to give steep high-band cut-off characteristics to a filter composed of analog elements, without loosing digital information included in signals being transmitted, and accordingly the noises cannot be eliminated satisfactorily unless when the symbol rate of the signal itself is sufficiently low.

In utilizing the scrambling in the data transmission apparatus, when a data pattern to be transmitted matches with a random number sequence employed at the scrambling, the same signal level would successively appear, resulting in that discontinuity of the same signal level cannot always be assured. While the bi-phase mark method assures the discontinuity of the same signal level at the binary transmission, when multi-valued transmission is performed in cases where several bits of data are transmitted at one time, the discontinuity of the same signal level cannot be obtained. In recent year, demands for multi-valued transmission have grown to implement higher-speed digital transmission or more efficient data transmission in a limited band, and the need for a method for more accurate data transmission at the multi-valued transmission has arisen. Further, in order to introduce a new transmission apparatus, replacement of the conventional transmission method or the like should be taken into consideration. More specifically, the new apparatus needs to be able to transmit data of the conventional transmission format without problems and, in the case of audio data for example, it is preferable that it can also transmit bi-phase mark data accurately.

Further, like in a case where the data transmission apparatus is mounted on a motor vehicle or the like, when the apparatus is in such environments that the ground levels of the connected devices greatly differ from each other or the fluctuations of the voltage are considerable, it is difficult to correctly transmit the voltage level at the transmitting end to the receiving end. Accordingly, phase modulation or the like is conventionally employed to enable data reproduction even when the absolute voltage cannot be detected accurately between the transmission end and the receiving end. However, a modulation method utilizing a specific carrier frequency unfavorably requires a frequency band that is twice as large as the frequency band of the baseband method that does not utilize the modulation.

Besides, in the data communication on motor vehicles, the amount of electromagnetic waves emitted from the transmission signal is limited so that the electromagnetic waves do not cause malfunctions of other equipment. One of International Standards concerning electromagnetic wave noise emitted from the equipment or communication wires on the motor vehicle is CISPR25. CISPR25 defines a limitation value of emitted noises for each frequency and, particularly, there are strict limitations on signals having frequencies of 30 MHz or higher. Therefore, it is desirable that data should be transmitted in a frequency band of 30 MHz or lower, in which countermeasures against the electromagnetic waves, such as shielding the signal line to reduce noises, can be taken without great difficulty. In order to transmit data efficiently in this frequency band, a data transmission method that is resistant to voltage fluctuations is needed also when the multi-valued transmission is performed without using modulation.

The present invention is made to solve the above-mentioned problems, and has for its object to provide a digital data transmission apparatus that emits few noises and has a higher resistance to noises, using inexpensive cables such as twisted pair cable, in data transmission at high speeds such as above 20 Mbps, and a transmission channel coding method and decoding method in which the same signal level will not successively appear also at the multi-valued transmission.

DISCLOSURE OF THE INVENTION

To solve the above-mentioned problems, according to one embodiment of the present invention, there is provided a digital data transmission apparatus including: a data coding means for converting digital data into a signal level corresponding to a symbol that is assigned to the digital data in each symbol cycle as a prescribed unit cycle; a first digital filter having a first sampling cycle that is shorter than a unit cycle of a signal level string that has been obtained by the data coding means, and allowing only predetermined frequencies to pass; a D/A conversion means for converting the digital data stream that has passed through the digital filter, into an analog signal; a low-pass filter for eliminating folding distortion of the first digital filter from the analog signal that has been obtained by the D/A conversion means, which distortion is decided in the first sampling cycle; a differential driver for converting an output from the low-pass filter, into two signals having opposite polarities relative to a predetermined reference potential, and inputting the two signals into a twisted pair cable; a differential receiver for receiving transmission signals transmitted through the twisted pair cable, and converting a difference in potential between two wires of the cable into a signal; an A/D conversion means for converting the signal outputted from the differential receiver into a digital signal value in each second sampling cycle; a second digital filter that allows only a predetermined frequency band of a digital data stream that has been obtained by sampling with the A/D conversion means, to pass; and a level evaluation means for evaluating a symbol value from a level of a signal in symbol timing, including a symbol in the signal, on the basis of an output from the second digital filter, and converting the symbol value into corresponding digital data, in which the first and second digital filters both have low-pass characteristics, and the first digital filter has frequency characteristics of cutting off at least frequency data which are higher than a frequency band in which electromagnetic waves emitted from the respective signals that pass through the twisted pair cable cancel each other out, thereby to eliminate emission of electromagnetic waves to outside the twisted pair cable.

According to another embodiment of the present invention, in a digital data transmission apparatus discussed above, transmission characteristics of the signal which has been passed through the first and second digital filters have roll-off characteristics.

According to another embodiment of the present invention, in a digital data transmission apparatus discussed above, the data coding means converts data comprising two or more bits per symbol cycle, into a symbol to be transmitted.

According to another embodiment of the present invention, in a digital data transmission apparatus discussed above, the data coding means includes signal levels which are more than the number of kinds of symbols to be transmitted per symbol cycle, and assigns a symbol in a symbol transmission timing to one of the signal levels.

According to another embodiment of the present invention, in a digital data transmission apparatus discussed above, the data coding means has five signal levels, and assigns a symbol in a symbol transmission timing to a signal level other than a previous signal level corresponding to a signal which was transmitted in immediately preceding symbol transmission timing, in the order of 01, 11, 00, 10, starting from a lowest signal level.

According to another embodiment of the present invention, in a digital data transmission apparatus discussed above, digital data to be transmitted have been coded by a bi-phase mark method, and the data coding means assigns a symbol in a symbol transmission timing to a signal level other than a previous signal level corresponding to a signal which was transmitted in immediately preceding symbol transmission timing, in the order of 01, 11, 00, 10 starting from a lowest signal level, thereby to decide a signal level to be transmitted.

According to another embodiment of the present invention, in a digital data transmission apparatus discussed above, the data coding means assigns a symbol in a symbol transmission timing alternately to one of signal levels which are as many as the number of kinds of symbols starting from a lowest signal level and to one of signal levels which are as many as the number of kinds of the symbols starting from a highest signal level, thereby to decide a signal level to be transmitted.

According to another embodiment of the present invention, in a digital data transmission apparatus discussed above, the data coding means includes: a previous signal level storage means for storing the previous signal level; and a coding means for deciding a signal level corresponding to a symbol to be transmitted, on the basis of the previous signal level and the symbol to be transmitted.

According to another embodiment of the present invention, in a digital data transmission apparatus discussed above, the coding means assigns a symbol in a symbol transmission timing to a signal level having a predetermined difference from the previous signal level that is stored in the previous signal level storage means.

According to another embodiment of the present invention, in a digital data transmission apparatus discussed above, the data coding means is supplied with a transmission method instruction signal indicating whether or not the transmission signal has been coded by a bi-phase mark method.

According to another embodiment of the present invention, in a digital data transmission apparatus discussed above, the level evaluation means includes: a signal level detection means for detecting a signal level in each symbol cycle; and a previous signal level storage means for storing a previous signal level which was received in immediately preceding symbol receipt timing, and the level evaluation means decodes the signal level detected by the signal level detection means, into a corresponding symbol, on the basis of the previous signal level that is stored in the previous signal level storage means.

According to another embodiment of the present invention, in a digital data transmission apparatus discussed above, the level evaluation means includes: a threshold control means for correcting an evaluation threshold level on the basis of variation values in respective signal levels which were received during a predetermined time period; a previous signal level storage means for storing the previous signal level; and a threshold evaluation means for holding a threshold and performing threshold evaluation to a difference in signal level between a signal level that is detected in symbol timing and the previous signal level, thereby to decode a symbol value.

According to another embodiment of the present invention, in a digital data transmission apparatus discussed above, the level evaluation means includes a synchronization means for establishing synchronization with a symbol cycle of a received signal, and the synchronization means extracts frequency components having a half cycle as long as the symbol cycle, from the received signal, and controls a symbol timing at which a symbol is detected, on the basis of a phase of the extracted signal.

According to another embodiment of the present invention, in a digital data transmission apparatus discussed above, the level evaluation means is supplied with a transmission method instruction signal indicating whether or not the received signal has been coded by the bi-phase mark method.

According to another embodiment of the present invention, a digital data transmission apparatus discussed above further includes: a scrambler for scrambling digital data to be transmitted; and a descrambler for descrambling received scrambled digital data.

According to another embodiment of the present invention, there is provided a data transmission apparatus including: a data coding means for converting digital data into a signal level corresponding to a symbol that is assigned to the digital data in each symbol cycle as a prescribed unit cycle; a first digital filter having a first sampling cycle that is shorter than a unit cycle of a signal level string which has been coded by the data coding means, and allowing only predetermined frequencies to pass; a D/A conversion means for converting a digital data stream that has passed through the digital filter, into an analog signal; a low-pass filter for eliminating folding distortion of the first digital filter from the analog signal obtained by the D/A conversion means, which distortion is decided in the first sampling cycle; and a differential driver for converting an output of the low-pass filter, into two signals having opposite polarities relative to a predetermined reference potential, and inputting the two signals into a twisted pair cable, in which the first digital filter has frequency characteristics of cutting off at least frequency data which are higher than a frequency band in which electromagnetic waves emitted from the respective signals that pass through the twisted pair cable cancel each other out, thereby to eliminate emission of electromagnetic waves to outside the twisted pair cable.

According to another embodiment of the present invention, there is provided a data receiving apparatus including: a differential receiver for receiving transmission signals transmitted through a twisted pair cable, and converting a difference in potential between two wires of the cable into a signal; an A/D conversion means for converting the signal outputted from the differential receiver into a digital signal value in each sampling cycle; a digital filter that allows only lower frequency components of a digital data stream that has been obtained by sampling with the A/D conversion means, to pass; and a level evaluation means for evaluating a symbol value from a level of a signal in symbol timing, including a symbol in the signal, on the basis of an output from the digital filter, and converting the symbol value into corresponding digital data.

According to another embodiment of the present invention, there is provided a data transmission/receiving apparatus including: a transmission/receiving control means that judges the received data that is outputted from the level evaluation means of the digital data transmission apparatus discussed above, inputs data to be retransmitted into the data coding means while outputting data that will not be retransmitted to outside as received data, and multiplexes transmission data that is inputted from outside into the retransmitted data, thereby to be inputted to the data coding means.

According to another embodiment of the present invention, there is provided a transmission channel coding method including steps of: when transmitting digital data as one symbol that is composed of an arbitrary number of bits, providing signal levels which are more than the number of kinds of symbols; and assigning a signal level that represents a symbol in a symbol transmission timing to one of the signal levels other than a previous signal level in immediately preceding symbol transmission timing.

According to another embodiment of the present invention in a transmission channel coding method discussed above, the signal level that represents the symbol in the transmission timing is assigned alternately to one of signal levels which are as many as the number of kinds of the symbols starting from a lowest signal level, and one of signal level which are as many as the number of kinds of the symbols starting from a highest signal level.

According to another embodiment of the present invention in a transmission channel coding method discussed above, the number of kinds of the symbols is four, and two-bit data is transmitted per symbol.

According to another embodiment of the present invention in a transmission channel coding method discussed above, 2-bit data are coded per one symbol by being assigned to signal levels in the order of 01, 11, 00, 10, starting from a lowest signal level.

According to another embodiment of the present invention in a transmission channel coding method discussed above, the signal level that represents the symbol in the symbol transmission timing is assigned to a signal level having a predetermined difference from the previous signal level.

According to another embodiment of the present invention in a transmission channel coding method discussed above, the number of the signal levels is one more than the number of kinds of symbols.

According to another embodiment of the present invention in a transmission channel coding method discussed above, the number of the signal levels is twice as many as the number of kinds of the symbols.

According to another embodiment of the present invention in a transmission channel coding method discussed above, the number of the signal level is 1.5 times as many as the number of kinds of the symbols.

According to another embodiment of the present invention in a transmission channel coding method discussed above, the digital data are scrambled data.

According to another embodiment of the present invention in a transmission channel coding method discussed above, the scrambling is self-synchronization scrambling in which transmission data is processed on the basis of data generated from the transmission data.

According to another embodiment of the present invention, there is provided a decoding method of making a symbol correspond to a difference in signal level between a signal level in a symbol receipt timing and a signal level in immediately preceding symbol receipt timing, to decode a signal level in a symbol receipt timing into a symbol.

Thus, according to another embodiment of the present invention, there is provided a digital data transmission apparatus including: a data coding means for converting digital data into a signal level corresponding to a symbol that is assigned to the digital data in each symbol cycle as a prescribed unit cycle; a first digital filter having a first sampling cycle that is shorter than a unit cycle of a signal level string that has been obtained by the data coding means, and allowing only predetermined frequencies to pass; a D/A conversion means for converting the digital data stream that has passed through the digital filter, into an analog signal; a low-pass filter for eliminating folding distortion of the first digital filter from the analog signal that has been obtained by the D/A conversion means, which distortion is decided in the first sampling cycle; a differential driver for converting an output from the low-pass filter, into two signals having opposite polarities relative to a predetermined reference potential, and inputting the two signals into a twisted pair cable; a differential receiver for receiving transmission signals transmitted through the twisted pair cable, and converting a difference in potential between two wires of the cable into a signal; an A/D conversion means for converting the signal outputted from the differential receiver into a digital signal value in each second sampling cycle; a second digital filter that allows only a predetermined frequency band of a digital data stream that has been obtained by sampling with the A/D conversion means, to pass; and a level evaluation means for evaluating a symbol value from a level of a signal in symbol timing, including a symbol in the signal, on the basis of an output from the second digital filter, and converting the symbol value into corresponding digital data, in which the first and second digital filters both have low-pass characteristics, and the first digital filter has frequency characteristics of cutting off at least frequency data which are higher than a frequency band in which electromagnetic waves emitted from the respective signals that pass through the twisted pair cable cancel each other out, thereby to eliminate emission of electromagnetic waves to outside the twisted pair cable. Therefore, a high transmission rate can be realized. In addition, a frequency band of the transmission signal can be limited to a frequency band having a noise elimination effect that is achieved when the signals having opposite polarities are passed through the twisted pair cable, thereby removing almost all electromagnetic noises also at high-speed data transmission.

According to another embodiment of the present invention, in a digital data transmission apparatus discussed above, transmission characteristics of the signal which has been passed through the first and second digital filters have roll-off characteristics. Therefore, the signal that has passed through the first digital filter and the second digital filter can be converted into a signal within a band that is slightly larger than half of the symbol rate. In addition, the signal is converted into a signal having no interference between adjacent codes in symbol timing, whereby a symbol included in the signal can be read in symbol timing.

According to another embodiment of the present invention, in a digital data transmission apparatus discussed above, the data coding means converts data comprising two or more bits per symbol cycle, into a symbol to be transmitted. Therefore, the symbol rate can be lowered, thereby realizing a high transmission rate. Further, every time one symbol is coded, a signal level that represents the symbol can be transmitted, thereby realizing data transmission with little delay.

According to another embodiment of the present invention, in a digital data transmission apparatus discussed above, the data coding means includes signal levels which are more than the number of kinds of symbols to be transmitted per symbol cycle, and assigns a symbol in a symbol transmission timing to one of the signal levels. Therefore, a symbol can be assigned to a predetermined signal level to be coded. Further, the symbol can be converted into a signal level that is different from the previous signal level, whereby the signals outputted from the transmitting end constantly vary with symbol timing, and synchronization can be readily obtained on the receiving end.

According to another embodiment of the present invention, in a digital data transmission apparatus discussed above, the data coding means has five signal levels, level to be transmitted. Therefore, the symbols are alternately coded into a lower signal level and an upper signal level. Further, in any case, the symbol can be coded into a signal level that is different from a previous signal level, whereby the signals that are transmitted from the transmitting end constantly vary with symbol timing, and synchronization can be readily established on the receiving end.

According to another embodiment of the present invention, in a digital data transmission apparatus discussed above, the data coding means includes: a previous signal level storage means for storing the previous signal level; and a coding means for deciding a signal level corresponding to a symbol to be transmitted, on the basis of the previous signal level and the symbol to be transmitted. Therefore, a symbol can be assigned to a predetermined signal level to be coded. In addition, the symbol can be converted into a signal level that is different from the previous signal level.

According to another embodiment of the present invention, in a digital data transmission apparatus discussed above, the coding means assigns a symbol in a symbol transmission timing to a signal level having a predetermined difference from the previous signal level that is stored in the previous signal level storage means. Therefore, the receiving end can evaluate a symbol of a received signal only on the basis of the difference in signal level from the previous signal level. Further, data transmission can be performed correctly also in cases where the transmitting end and the receiving end have different voltage levels at multi-valued transmission of the baseband, or in environments where fluctuations in the voltage are large. and assigns a symbol in a symbol transmission timing to a signal level other than a previous signal level corresponding to a signal which was transmitted in immediately preceding symbol transmission timing, in the order of 01, 11, 00, 10, starting from a lowest signal level. Therefore, a symbol can be assigned to a predetermined signal level to be coded.

According to another embodiment of the present invention, in a digital data transmission apparatus discussed above, digital data to be transmitted have been coded by a bi-phase mark method, and the data coding means assigns a symbol in a symbol transmission timing to a signal level other than a previous signal level corresponding to a signal which was transmitted in immediately preceding symbol transmission timing, in the order of 01, 11, 00, 10 starting from a lowest signal level, thereby to decide a signal level to be transmitted. Therefore, the data that have been coded by a bi-phase mark method can be transmitted. The data coded by the bi-phase mark method can be decoded into a symbol by evaluating a signal only by an evaluation as to whether the data is higher or lower than one threshold, like in the binary transmission, whereby signal detection having a reliability that is quite close to the binary evaluation can be performed. Further, possible values taken in the respective symbol timing are binary, and the distance between symbols is 2 or more symbols across the signal level 2, so that the possibility of error evaluation caused by noises can be reduced to a level as low as the binary transmission.

According to another embodiment of the present invention, in a digital data transmission apparatus discussed above, the data coding means assigns a symbol in a symbol transmission timing alternately to one of signal levels which are as many as the number of kinds of symbols starting from a lowest signal level and to one of signal levels which arc as many as the number of kinds of the symbols starting from a highest signal level, thereby to decide a signal According to another embodiment of the present invention, in a digital data transmission apparatus discussed above, the data coding means is supplied with a transmission method instruction signal indicating whether or not the transmission signal has been coded by a bi-phase mark method. Therefore, the transmission signal can be coded in accordance with the transmission method, whereby data based on the bi-phase mark method as a conventional transmission method can be transmitted.

According to another embodiment of the present invention, in a digital data transmission apparatus discussed above, the level evaluation means includes: a signal level detection means for detecting a signal level in each symbol cycle; and a previous signal level storage means for storing a previous signal level which was received in immediately preceding symbol receipt timing, and the level evaluation means decodes the signal level detected by the signal level detection means, into a corresponding symbol, on the basis of the previous signal level that is stored in the previous signal level storage means. Therefore, the symbol of the received signal can be evaluated on the basis of the previous signal level and the signal level of the received signal. Further, every time one signal level is received, a symbol represented by the signal level can be obtained, thereby realizing data receipt with little delay.

According to another embodiment of the present invention, in a digital data transmission apparatus discussed above, the level evaluation means includes: a threshold control means for correcting an evaluation threshold level on the basis of variation values in respective signal levels which were received during a predetermined time period; a previous signal level storage means for storing the previous signal level; and a threshold evaluation means for holding a threshold and performing threshold evaluation to a difference in signal level between a signal level that is detected in symbol timing and the previous signal level, thereby to decode a symbol value. Therefore, a symbol of a received signal can be evaluated only on the basis of the difference in signal level from the previous signal level. Thus, for example, when the transmitting end and the receiving end have different potentials or when the potentials vary, the data can be correctly decoded even when the absolute voltage level on the transmitting end cannot be detected. Further, the threshold is modified on the basis of the evaluation result on signals which have been received for a predetermined time period, so that correct data can be obtained by modifying the threshold in cases where transmitted voltage varies according to fluctuations in the supply voltage, or the like.

According to another embodiment of the present invention, in a digital data transmission apparatus discussed above, the level evaluation means includes a synchronization means for establishing synchronization with a symbol cycle of a received signal, and the synchronization means extracts frequency components having a half cycle as long as the symbol cycle, from the received signal, and controls a symbol timing at which a symbol is detected, on the basis of a phase of the extracted signal. Therefore, a more reliable synchronization can be obtained utilizing changes in signal level of the received signal.

According to another embodiment of the present invention, in a digital data transmission apparatus discussed above, the level evaluation means is supplied with a transmission method instruction signal indicating whether or not the received signal has been coded by the hi-phase mark method. Therefore, the transmitted data can be decoded in accordance with the transmission method, whereby data based on the bi-phase mark method as a conventional transmission method can be received.

According to another embodiment of the present invention, a digital data transmission apparatus discussed above further includes: a scrambler for scrambling digital data to be transmitted; and a descrambler for descrambling received scrambled digital data. Therefore, it is possible to prevent digital data from successively having the same value.

According to another embodiment of the present invention, there is provided a data transmission apparatus including: a data coding means for converting digital data into a signal level corresponding to a symbol that is assigned to the digital data in each symbol cycle as a prescribed unit cycle; a first digital filter having a first sampling cycle that is shorter than a unit cycle of a signal level string which has been coded by the data coding means, and allowing only predetermined frequencies to pass; a D/A conversion means for converting a digital data stream that has passed through the digital filter, into an analog signal; a low-pass filter for eliminating folding distortion of the first digital filter from the analog signal obtained by the D/A conversion means, which distortion is decided in the first sampling cycle; and a differential driver for converting an output of the low-pass filter, into two signals having opposite polarities relative to a predetermined reference potential, and inputting the two signals into a twisted pair cable, in which the first digital filter has frequency characteristics of cutting off at least frequency data which are higher than a frequency band in which electromagnetic waves emitted from the respective signals that pass through the twisted pair cable cancel each other out, thereby to eliminate emission of electromagnetic waves to outside the twisted pair cable. Therefore, a high transmission rate can be obtained, in addition, the frequency band of the transmission signal can be limited to a frequency band having a noise elimination effect that is achieved when the signals having opposite polarities are passed through the twisted pair cable, thereby removing almost all electromagnetic wave noises at high-speed data transmission.

According to another embodiment of the present invention, there is provided a data receiving apparatus including: a differential receiver for receiving transmission signals transmitted through the twisted pair cable, and converting a difference in potential between two wires of the cable into a signal; an A/D conversion means for converting the signal outputted from the differential receiver into a digital signal value in each sampling cycle; a digital filter that allows only lower frequency components of a digital data stream that has been obtained by sampling with the A/D conversion means, to pass; and a level evaluation means for evaluating a symbol value from a level of a signal in symbol timing, including a symbol in the signal, on the basis of an output from the digital filter, and converting the symbol value into corresponding digital data. Therefore, the received signal obtained by the conversion in the digital filter, which signal has no interference between adjacent symbols and includes a symbol that can be read in an appropriate timing, can be sampled in each symbol timing, thereby decoding a symbol included therein.

According to another embodiment of the present invention, there is provided a data transmission/receiving apparatus including: a transmission/receiving control means that judges the received data that is outputted from the level evaluation means of the digital data transmission apparatus of claim 1, inputs data to be retransmitted into the data coding means while outputting data that will not be retransmitted to outside as received data, and multiplexes transmission data that is inputted from outside into the retransmitted data, thereby to be inputted to the data coding means. Therefore, various data can be transmitted or received while selecting necessary data.

According to another embodiment of the present invention, there is provided a transmission channel coding method including steps of: when transmitting digital data as one symbol that is composed of an arbitrary number of bits, providing signal levels which are more than the number of kinds of symbols; and assigning a signal level that represents a symbol in a symbol transmission timing to one of the signal levels other than a previous signal level in immediately preceding symbol transmission timing. Therefore, a signal having signal levels that constantly vary in adjacent symbol transmission timing can be transmitted, whereby an apparatus that receives the signal and decodes a symbol included in the received signal can establish synchronization easily. Further, every time one symbol is coded, a signal level representing the symbol can be transmitted, thereby performing data transmission with little delay.

According to another embodiment of the present invention in a transmission channel coding method discussed above, the signal level that represents the symbol in the transmission timing is assigned alternately to one of signal levels which are as many as the number of kinds of the symbols starting from a lowest signal level, and one of signal level which are as many as the number of kinds of the symbols starting from a highest signal level. Therefore, the transmission signals can be assigned alternately to a lower signal level and an upper signal level, thereby multiplexing clock components therein.

According to another embodiment of the present invention in a transmission channel coding method discussed above, the number of kinds of the symbols is four, and two-bit data is transmitted per symbol. Therefore, efficient data transmission can be realized in a limited band.

According to another embodiment of the present invention in a transmission channel coding method of discussed above, 2-bit data are coded per one symbol by being assigned to signal levels in the order of 01, 11, 00, 10, starting from a lowest signal level. Therefore, the symbol can be assigned to a predetermined signal level to be coded.

According to another embodiment of the present invention in a transmission channel coding method discussed above, the signal level that represents the symbol in the symbol transmission timing is assigned to a signal level having a predetermined difference from the previous signal level. Therefore, in any case, the symbol can be converted into a signal level that is different from the previous signal level, whereby the signals outputted from the transmitting end constantly vary with symbol timing, and synchronization can be readily obtained on the receiving end. Further, data transmission can be performed correctly also in cases where the transmitting end and the receiving end have different voltage levels at multi-valued transmission of the baseband, or in environments where fluctuations in the voltage are large.

According to another embodiment of the present invention in a transmission channel coding method discussed above, the number of the signal levels is one more than the number of kinds of symbols. Therefore, the previous signal level can be inhibited, and thus the output signals are mapped to the signal levels other than the previous signal level, thereby preventing the same signal level from being successively outputted.

According to another embodiment of the present invention in a transmission channel coding method discussed above, the number of the signal levels is twice as many as the number of kinds of the symbols. Therefore, the symbols can be coded alternately into a lower signal level and an upper signal level. Further, in any case, the symbol can be converted into a signal level that is different from the previous signal level, whereby the signals outputted from the transmitting end constantly vary with symbol timing, and synchronization can be readily obtained on the receiving end.

According to another embodiment of the present invention in a transmission channel coding method discussed above, the number of the signal level is 1.5 times as many as the number of kinds of the symbols. Therefore, the symbols can be coded alternately into a lower signal level and an upper signal level.

According to another embodiment of the present invention in a transmission channel coding method discussed above, the digital data are scrambled data. Therefore, it is possible to prevent digital data from successively having the same value.

According to another embodiment of the present invention in a transmission channel coding method discussed above, the scrambling is self-synchronization scrambling in which transmission data is processed on the basis of data generated from the transmission data. Therefore, clock components can be multiplexed into the transmission signal with reliability. Further, the descrambling can be carried out without adjusting timing on the transmitting end and the receiving end, whereby any data can be transmitted or received.

According to another embodiment of the present invention, there is provided a decoding method of making a symbol correspond to a difference in signal level between a signal level in a symbol receipt timing and a signal level in immediately preceding symbol receipt timing, to decode a signal level in a symbol receipt timing into a symbol. Therefore, the symbol of the received signal can be evaluated only on the basis of a difference in signal level from the previous signal level. Thus, for example, when the transmitting end and the receiving end have different potentials or when the potentials vary, the data can be correctly decoded even when the absolute voltage level on the transmitting end cannot be detected.

BRIEF DESCRIPTION OF THE DRAWINGS

FIG. 16 is a diagram showing an example of a data stream that is coded by the coding unit according to the second embodiment.

FIG. 20 is a diagram showing values which are held by a signal level difference threshold holding unit according to the second embodiment.

FIG. 21 is a diagram showing the relationship between the signal level difference and the corresponding number of difference levels according to the second embodiment.

FIG. 22 is a diagram showing an example of an inverse mapping table that is employed by the decoding unit according to the second embodiment.

FIG. 23 is a diagram showing another example of the mapping table that is employed by the coding unit according to the second embodiment.

FIG. 24 is a diagram showing another example of the mapping table that is employed by the coding unit according to the second embodiment.

FIG. 25 is a diagram showing another example of the mapping table that is employed by the coding unit according to the second embodiment.

BEST MODE FOR CARRYING OUT THE INVENTION

Hereinafter, embodiments of the present invention will be described with reference to the drawings. The embodiments shown here are only exemplary, and the invention is not limited to these embodiments.

Embodiment 1

Initially, a digital data transmission apparatus, a data transmission apparatus, a data receiving apparatus, a transmission channel coding method, and a decoding method will be described as a first embodiment, with reference to the drawings.

Figure 1:
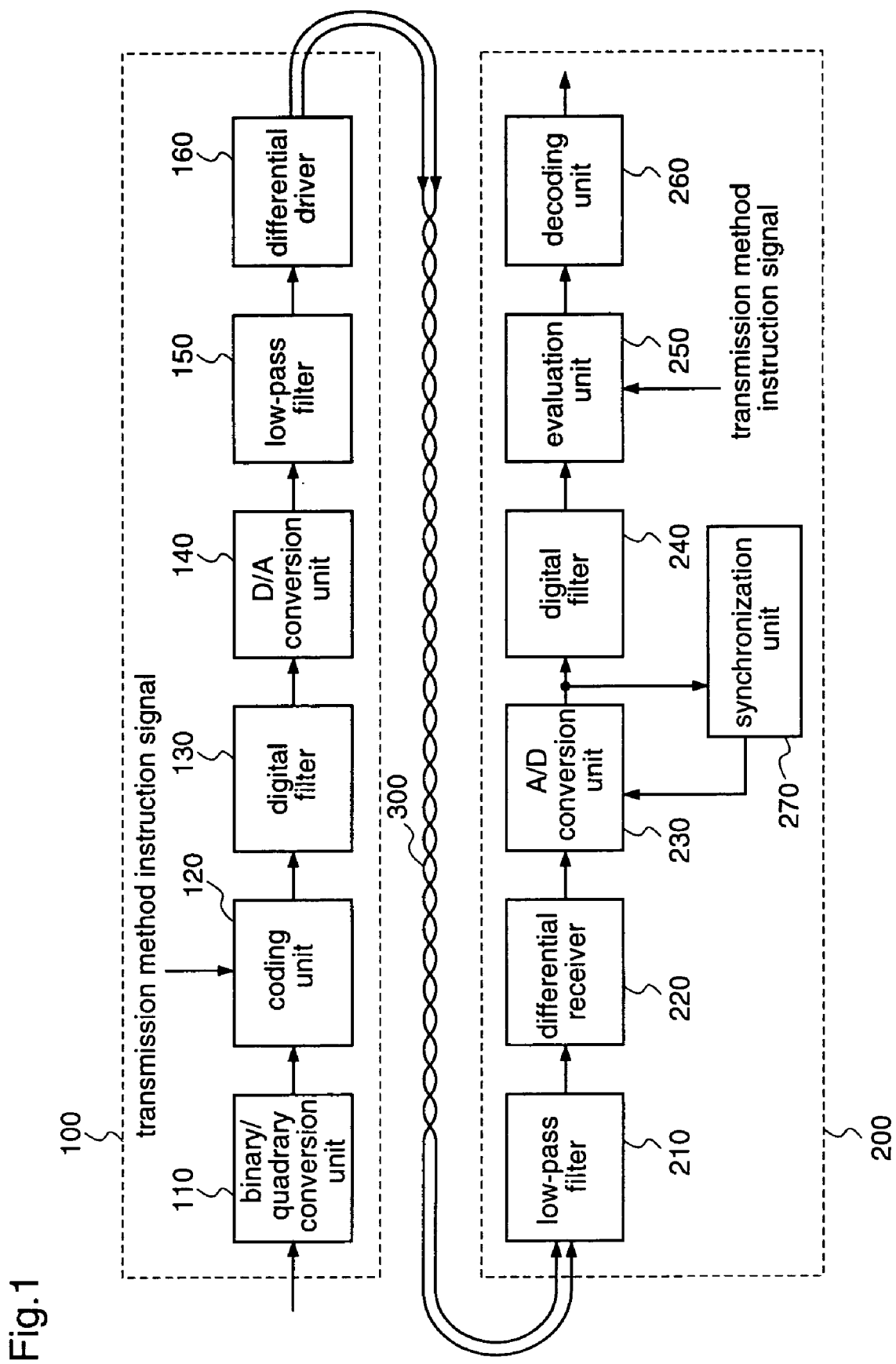
FIG. 1 is a block diagram illustrating a structure of a digital data transmission apparatus according to a first embodiment of the present invention.

FIG. 1 is a block diagram illustrating a structure of a digital data transmission apparatus according to the first embodiment.

As shown in FIG. 1, the digital data transmission apparatus according to the first embodiment includes a transmitting end 100 for transmitting data, and a receiving end 200 for receiving the data transmitted from the transmitting end 100, which are connected with each other through a twisted pair cable 300.

The transmitting end 100 includes a binary-to-quadrary conversion unit 110 for converting a 1-bit data stream into a 2-bit (four-valued) data stream; a coding unit 120 for mapping 2-bit data that is obtained by the binary/quadrary conversion unit to a predetermined signal level to be coded; a digital filter 130 that allows a band of frequency components corresponding to half of a symbol rate to pass; a D/A conversion unit 140 for converting the 2-bit data that has passed through the digital filter 130 into an analog signal; a low-pass filter 150 for eliminating a high-band signal from the analog signal; and a differential driver 160 for converting the analog signal that has passed through the low-pass filter 150 into two signals having opposite polarities relative to a reference potential, and inputting the two signals to the twisted pair cable 300.

The receiving end 200 includes a low-pass filter 210 that eliminates noises outside the signal band of a transmission signal for both wires of the twisted pair cable 300; a differential receiver 220 for receiving a signal that has passed through the low-pass filter 210, an A/D conversion unit 230 for converting the received signal into a digital signal; a digital filter 240 that allows only a predetermined frequency band to pass; an evaluation unit 250 for evaluating the level of the received signal; a decoding unit 260 for decoding the signal level evaluated by the evaluation unit 250 into 2-bit receipt data; and a synchronization unit 270 for generating a clock that is employed at the A/D conversion.

The operation of the digital data transmission apparatus that is constructed as described above will be described.

A digital signal that is transmitted through the transmitting end 100 is initially inputted to the binary/quadrary conversion unit 110. The binary/quadrary conversion unit 110 converts a 1-bit data stream into a 2-bit (four-valued) data stream, i.e., "01" "11", "00", or "10", and transmits the 2-bit data stream to the coding unit 120.

Figures 2, 3:
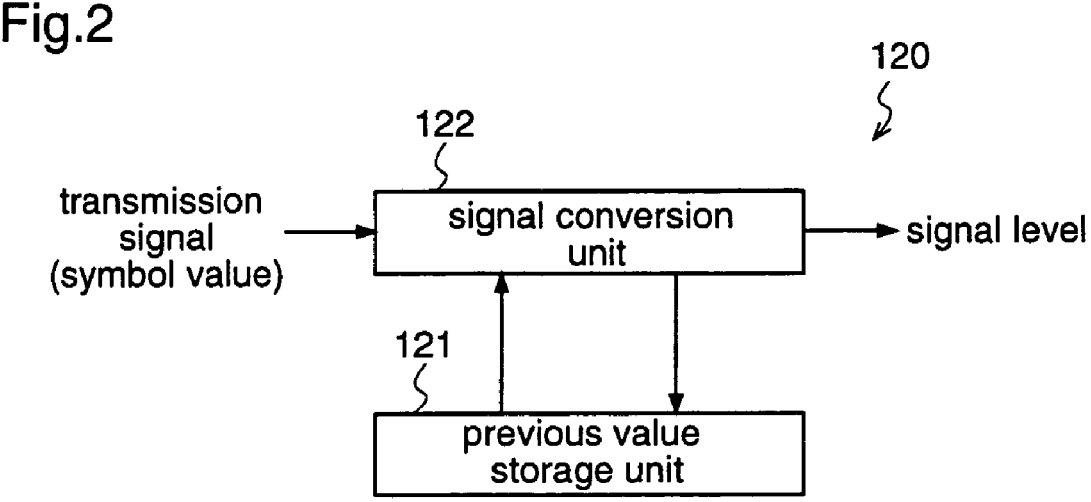
FIG. 2 is a block diagram illustrating a structure of a coding unit according to the first embodiment.
FIG. 3 is a diagram for explaining a coding process by a signal conversion unit according to the first embodiment.

The coding unit 120 performs a coding process by mapping the signal inputted from the binary/quadrary conversion unit 110 to a signal level that represents the value of the signal. This coding unit 120 includes, as shown in FIG. 2, a previous value storage unit 121 for storing a previous value that is obtained by coding the immediately preceding data, and a signal conversion unit 122 for performing a coding process on the basis of the previous value that is stored in the previous value storage unit 121 and the signal outputted from the binary/quadrary conversion unit 110. The signal conversion unit 122 maps the signal to a signal level other than the level of the signal that has been coded immediately before, with reference to a conversion table as shown in FIG. 3. The conversion table shown in FIG. 3 defines the signal levels to which the symbols to be transmitted, i.e., "01", "11", "00", or "10", are mapped on the basis of the previous signal level (0 to 4), so that the symbol is mapped to a signal level that is different from the previous level. For example, when the previous value stored in the previous value storage unit 121 is a signal level "0", and a symbol "01" is newly inputted from the binary/quadrary conversion unit 110, the signal conversion unit 122 converts this symbol into a signal level "1". The inputted signals are similarly mapped to four-value signal levels other than the respective previous signal levels. Thus, the coding unit 120 encodes the signal into a signal level that is different from the previous signal level in any case.

Frequency components of the coded signal, which are higher than half of the symbol rate, are eliminated by the digital filter 130. This digital filter 130 is a low-pass filter that allows a band of frequency components corresponding to half of the symbol rate to pass, and this digital filter is practically constructed so as to provide appropriate roll-off characteristics in conjunction with the digital filter 240 on the receiving end 200. The transmission of pulse signals requires an infinite bandwidth, but when the signal is passed through a filter having the roll-off characteristics, the signal is turned into a signal within a band that is slightly larger than half of the symbol rate, and converted into a signal without interference between adjacent codes in the reading timing. Accordingly, the data to be transmitted is converted into a signal in a limited band.

The signal that has passed through the digital filter 130 is converted into an analog signal by the D/A conversion unit 140. That is, the signal is converted into a signal that includes a coded symbol in symbol timing of each symbol cycle. Folding frequency components of the analog signal, which appear in a band of frequencies that are twice as high as the frequencies that have passed through the digital filter 130 or higher frequencies, are eliminated by the low-pass filter 150, and the obtained signal is transmitted to the differential driver 160. The differential driver 160 converts the inputted signal into two signals having amplitudes which are proportional to the inputted signal and opposite polarities relative to a reference potential, and differentially outputs the obtained two signals to the twisted pair cable 300. The signal outputted from the differential driver 160 is a signal that is always coded so as to have a signal level different from the previous signal level, and this signal has values which constantly vary with symbol timing.

Then, the receiving end 200 makes the transmission signals which have been transmitted through both wires of the twisted pair cable 300 pass through the low-pass filter 210, to eliminate noises outside a predetermined signal band. For example, larger noises in the range of some kilohertz to one GHz may be contained when the apparatus is mounted on a motor vehicle and, when such high-frequency noises are contained, the frequency characteristics of the differential receiver 220 in the next stage cannot compensate for desired characteristics. Accordingly, the low-pass filter 210 cuts off components of an area in which the frequency characteristics of the receiver 220 cannot compensate for the desired characteristics, as well as converts the signal into a signal of a band which can be processed by the digital filter 240 that is connected in the later stage.

Then, the signal from which the noises have been eliminated by the low-pass filter 210 is received by the differential receiver 220. The differential receiver 220 outputs a signal which is proportional to a difference signal between the both wires of the twisted pair cable 300, and then the outputted signal is converted into a digital signal by the A/D conversion unit 230. Here, the synchronization unit 270 generates a synchronized sampling clock and transmits the sampling clock to the A/D conversion unit 230, so that the A/D conversion unit 230 performs sampling in the symbol timing.

Figures 6, 7:
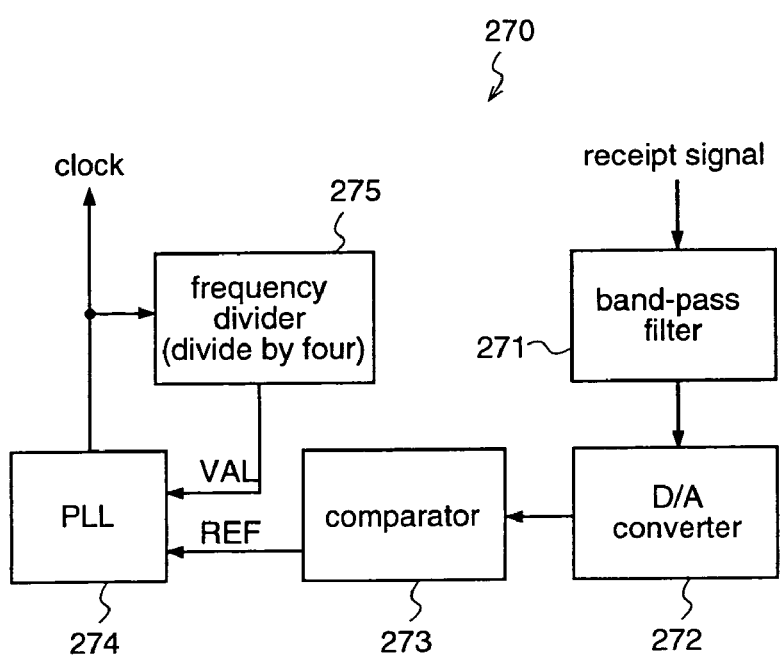
FIG. 6 is a diagram for explaining a decoding process by a signal conversion unit according to the first embodiment.
FIG. 7 is a block diagram illustrating a structure of a synchronization unit according to the first embodiment.

The synchronization unit 270 includes a band pass filter 271, a D/A converter 272, a comparator 273, a PLL 274, and a frequency divider 275, as shown in an example of the construction of FIG. 7. Here, the frequency division rate of the frequency divider 275 is decided depending on how many times the sampling cycle is as high as the symbol cycle. For example, when the sampling rate is twice as high as the symbol rate, the frequency is divided by four. The synchronization unit 270 makes clock synchronization utilizing the signal levels of the received signal, which constantly vary with the symbol cycle. Frequency components corresponding to half of the symbol rate are extracted from the received signal by the band pass filter 271, then the signal is converted into an analog signal by the D/A converter 272, and the analog signal is converted into a square wave signal by the comparator 273. This square wave signal is inputted to the PLL 274 as a reference clock (REF), and phase comparison is performed between the reference clock and a clock (VAL) that is obtained by dividing the frequency of a clock outputted from the PLL 274 in the frequency divider 275, thereby establishing the clock synchronization. Consequently, the A/D conversion unit 230 samples the signal in the symbol timing, thereby to converts the analog signal into a digital signal. The structure of the synchronization unit 270 is not limited to that shown in FIG. 7, and reproduction synchronization can be easily realized on the receiving end utilizing the fact that the values of other means also constantly vary with the symbol cycle.

The obtained digital signal is passed through the digital filter 240. The digital filter 240 provides roll off characteristics in conjunction with the digital filter 130 on the transmitting end 100, and converts the passed digital signal into a signal that has no interference between adjacent codes and can be read in appropriate timing.

Figure 4:
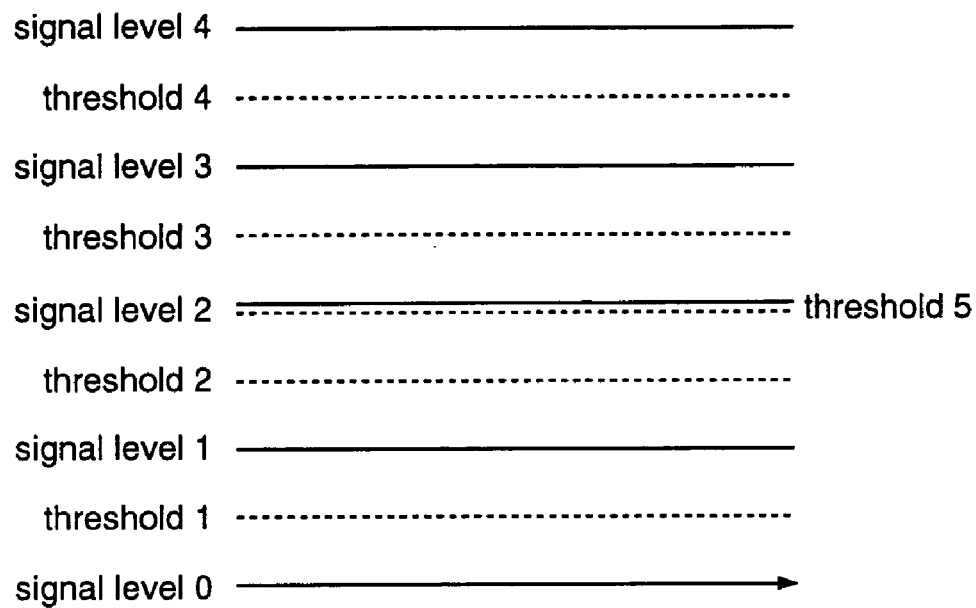
FIG. 4 is a diagram for explaining an evaluation process in an evaluation unit according to the first embodiment.

Then, the evaluation unit 250 evaluates the level of the signal that has been sampled in symbol timing, to decide a signal level from five-value levels. This evaluation process is carried out as shown in FIG. 4, and the evaluation unit 250 evaluates the level of the sampled signal to decide one of signal levels 0, 1, 2, 3 and 4, on the basis of thresholds 1, 2, 3, and 4.

Figure 5:
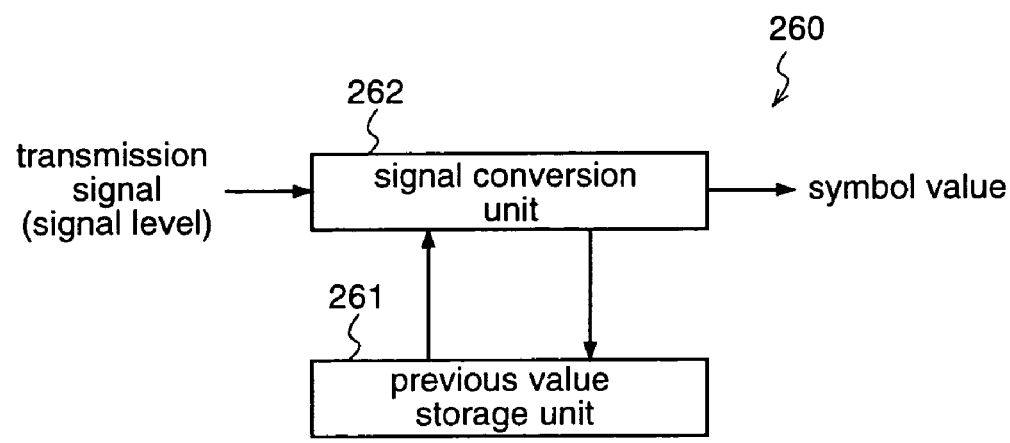
FIG. 5 is a block diagram illustrating a structure of a decoding unit according to the first embodiment.

The decoding unit 260 converts the signal level that has been evaluated by the evaluation unit 250 into 2-bit receipt data. This decoding unit 260 includes, as shown in FIG. 5, a previous value storage unit 261 for storing a previous signal level that has been evaluated by the evaluation unit 250 in the immediately preceding symbol timing, and a signal conversion unit 262 for performing a decoding process on the basis of the signal level stored in the previous value storage unit 261 and the signal level outputted from the evaluation unit 250. The signal conversion unit 262 decodes the signal level into a symbol with reference to the conversion table shown in FIG. 6. The conversion table in FIG. 6 is identical to the table that is employed at the coding by the coding unit 120 of the digital data transmission apparatus 100, and the receipt data is obtained with reference to the same conversion table as employed at the conversion in the digital data transmission apparatus 100. For example, when the previous value stored in the previous value storage unit 261 is the signal level 0 and when a signal level 4 (set value) is newly inputted from the evaluation unit 250, the signal conversion unit 262 converts the signal level into a symbol "10".

Now, a description will be given of a large reduction in electromagnetic waves emitted from the twisted pair cable 300 as the transmission cable of the digital data transmission apparatus according to the first embodiment.

One of the International Standards associated with electromagnetic wave noises emitted from equipment or communication lines on motor vehicles is CISPR25. CISPR25 defines a limitation value on the emitted noises for each frequency.

For example, in the case of a balanced transmission through a twisted pair cable without shielding, a limitation value is defined for a frequency band of 30 MHz or higher, in which the amount of emitted noises is relatively difficult to reduce. Thus, when signals in a frequency band of 30 MHz or higher are transmitted, it is difficult to satisfy the on-vehicle requirements. A limitation value for the emitted noises is defined also for a band of 30 MHz or lower, while in this case it is possible to reduce the amount of noises by keeping balancing. Therefore, when the frequency band of the transmission signal is reduced to 30 MHz or lower, the amount of emitted noises which complies with the on-vehicle requirements can be obtained.

The twisted pair cable 300 has errors in the twisting pitch or the length of a wire connecting to the driver, and accordingly the transmission signal is slightly out of phase. The influence of the phase shifting gets larger as the frequencies of the signals to be transmitted are higher, and the signals do not cancel out the emitted noises. Thus, the digital filter performs a band limitation so that the signal bands of transmission signals are within the range of frequencies in which the emitted noises sufficiently cancel each other out.

Figures 8, 9, 10:
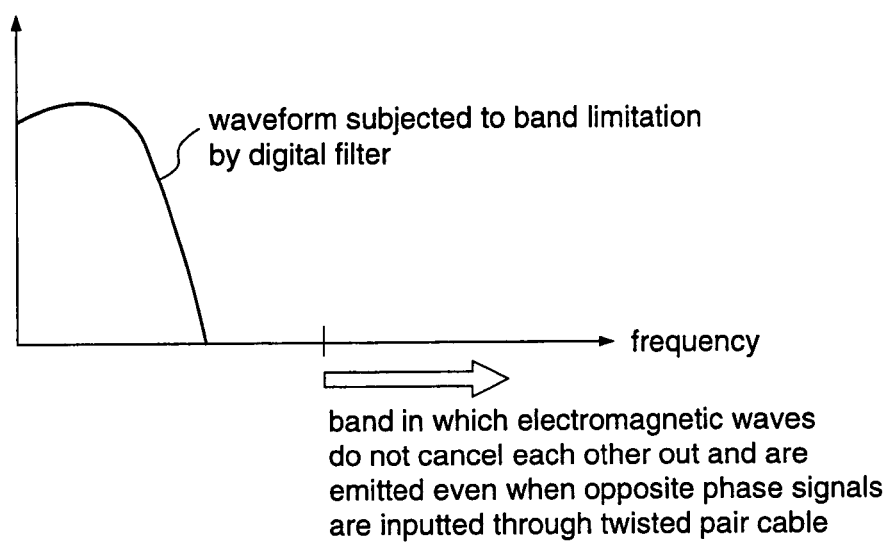
FIG. 8 is a diagram for explaining a noise elimination effect according to the first embodiment.
FIG. 9 is a diagram for explaining possible values in a case where data are coded by a bi-phase mark method according to the first embodiment.
FIG. 10 is a diagram for explaining symbol arrangement on the basis of a difference from the previous level, as another example of the coding process by the signal conversion unit according to the first embodiment.

FIG. 8 is a diagram for explaining the relation between the noise elimination effect and the frequency level at the transmission through a twisted pair cable. The noise elimination effects of the twisted pair cable vary with the production precision, but the noise elimination effect is noticeably reduced when the frequency is beyond approximately 30 MHz. Accordingly, the digital filter limits the signal band to below 30 MHz.

The digital filter 130 samples the signal at a frequency higher than the symbol rate. Then, the digital filter 130 sets frequency characteristics so that the combined characteristics of the digital filter 130 and the digital filter 240 have roll-off characteristics relative to half of the symbol rate, and the obtained characteristics are equally divided and given to the digital filters 130 and 240. A digital filter having such characteristics may be constituted by tens of FIR (FINITE IMPULSE RESPONSE) digital filters having coefficients.

The digital filters 130 and 240 are low-pass filters that allow frequencies up to a level slightly higher than half of the symbol rate, to pass.

Therefore, signals having opposite polarities of a frequency band that is slightly higher than half of the symbol rate (which are accurately calculated on the basis of the rate of the roll-off characteristics, i.e., the percentage) are transmitted through the twisted pair cable 300. Then, the signals having opposite polarities are passed through two transmission wires of the twisted pair cable 300, then the electromagnetic waves emitted therefrom cancel each other out, resulting in almost no noise emission.

When 48 Mbps transmission is to be performed, the number of bits transmitted per symbol is set at 2 bits, and the symbol rate in this case is 24 MHz.

Further, when the roll off filter that is constituted by the digital filters 130 and 240 includes the roll off characteristics of approximately 15% relative to 12 MHz, the signal band can be limited to approximately 15 MHz. Such characteristics are realized by utilizing characteristics of a digital filter that enables to flexibly design frequency characteristics or phase characteristics and can realize steep frequency characteristics with ideal phase characteristics, thereby to limit a band of the data to a frequency band of the twisted pair cable having the noise elimination effect. Further, the multi-valued transmission enables to lower the symbol rate, thereby realizing a higher transmission rate.

As described above, according to the digital data transmission apparatus and the transmission channel coding method and decoding method of the first embodiment, signal levels which are more than the number of symbols to be transmitted are provided, and the signal level representing each symbol in each symbol transmission timing is mapped to a signal level other than the signal level that was transmitted in the previous symbol timing. Thus, in any case, the signal can be converted into a signal level that is different from the previous signal level and, accordingly, the signals outputted from the transmitting end 100 always have values varying with the symbol cycle, thereby facilitating the synchronization on the receiving end 200. Further, the signal level that represents a symbol is transmitted each time the symbol is coded, thereby realizing the data transmission with little delay.

In addition, the digital filter 130 and the digital filter 240 constitute a filter having appropriate roll off characteristics, whereby the signal that has passed through the filters is converted into a signal within a frequency band that is slightly larger than half of the symbol rate. Further, the signal is converted into a signal without interference between adjacent codes in predetermined timing, so that a code included in the signal can be read in predetermined timing.

The coding unit 120 converts a signal into a symbol that enables transmission of data comprising 2 or more bits per symbol timing, whereby efficient data transmission can be performed in a limited frequency band.

In the coding unit 120, the previous signal level is stored in the previous value storage unit 121, and the signal conversion unit 122 encodes a symbol to be transmitted on the basis of the previous signal level. Therefore, the signal can be mapped to a signal level other than the signal level which was transmitted in the previous symbol timing, whereby the signal is converted into a signal level that is different from the previous signal level in any case.

In the decoding unit 260, the previous signal level is stored in the previous value storage unit 261, and the signal conversion unit 262 decodes the received signal level on the basis of the previous signal level, whereby the transmitted symbol is obtained from the received signal level. In addition, a symbol that is represented by a signal level is obtained each time the signal level is received, thereby realizing the data receipt with little delay.

Further, 2-bit data is transmitted per symbol and the number of symbols to be transmitted is set at four, so that efficient data transmission is performed in a limited band.

Further, signal levels which are one more than the number of symbols to be transmitted are provided, so that the previous signal level is prohibited and the symbol to be transmitted is mapped to the signal level other than the previous value, whereby continuous outputs of the same signal level is avoided.

Furthermore, the symbols to be transmitted are mapped to the signal levels in the order of "01", "11", "00", and "10" starting from the lowest signal level, so that the symbols can be mapped to the corresponding predetermined signal levels.

The symbols are made correspond to the respective signal levels other than the previous signal level on the basis of the signal level of the immediately preceding detected signal, to decode the detected signal level into a symbol, whereby the transmitted symbol can be obtained from the received signal level. Further, a symbol that is represented by a signal level can be obtained each time the signal level is received, thereby realizing the data receipt with little delay.

The synchronization unit 270 extracts, from a receipt signal, frequency components having a cycle that is half of the symbol cycle signal, and controls the symbol extraction timing on the basis of the phase of the extracted signal, whereby a more reliable synchronization can be established utilizing changes in the signal level of the receipt signal.

In the digital transmission of audio data, the data that has been coded according to the bi-phase mark method are transmitted using a plastic optical fiber or the like. It is envisioned that these signals that have been coded by the bi-phase mark method are transmitted/received also by the digital data transmission apparatus of the present invention. FIG. 9 is a diagram showing possible values in the case where the signals are coded by the bi-phase mark method. In this figure, symbols other than circled and boxed symbols will not be coded. Values which can be taken in each symbol timing are binary, and the distance between adjacent symbols is 2 or more symbols across the signal level 2.

When the digital data transmission apparatus according to this invention transmits/receives data corresponding a bit string or data that has been coded by the bi-phase mark method, a transmission method instruction signal is inputted to the coding unit 120 and the evaluation unit 250, to switch between a case of transmitting simply a bit string and a case of transmitting the data that has been coded by the bi-phase mark method.

When the transmission method instruction signal indicates the bi-phase mark method, the coding unit 120 encodes an inputted symbol with referring to the conversion table shown in FIG. 9.

When the transmission method instruction signal indicates the bi-phase mark method, the evaluation unit 250 decides whether a received signal is higher or lower than threshold 5 shown in FIG. 4. When the previous signal level is 0, and when the received signal is higher than the threshold 5 the signal level of the received signal is set at 3, while the signal level is set at 1 when the received signal is lower than the threshold 5. Similarly, when the previous signal level is 1 and when the received signal is higher than the threshold 5 the signal level of the received signal is set at 3, while the signal level is set at 0 when the received signal is lower than the threshold 5. When the previous signal level is 3, and when the received signal is higher than the threshold 5 the signal level of the received signal is set at 4, while the signal level is set at 1 when the received signal is lower than the threshold 5. When the previous signal level is 4, and when the received signal is higher than the threshold 5 the signal level of the received signal is set at 3, while the signal level is set at 1 when the received signal is lower than the threshold 5.

Thus, the transmission/receipt of data which have been coded according to the bi-phase mark method can realize resistance to noises that is quite close to the binary transmission. On the receiving end 200, a threshold at the threshold evaluation with the previous signal level and the signal level of the received signal is set at threshold 5, and the symbol can be decoded by evaluating the signal only by deciding whether it is higher or lower than a threshold, like in the binary transmission, thereby realizing signal detection having a reliability that is quite close to the binary evaluation. Further, possible values taken in each symbol timing are binary, and the distance between symbols is two or more symbols across the signal level 2, so that the possibility of errors caused by noises can be suppressed to a level as low as the binary transmission.

In this embodiment, the four-value symbol is converted into five-value signal levels, while also in cases where the four-value symbol is converted into multi-value signal levels which are more than four, such as 8-value or 16-value, the similar method is used to prevent a code from being mapped to the signal level of the immediately preceding signal, and accordingly the same effects are obtained.

In this first embodiment, the coding by the coding unit 120 is performed with reference to the conversion table as shown in FIG. 3, while the coding is not restricted to this method, but the coding can be performed with reference to a conversion table as shown in FIG. 10.

The conversion table shown in FIG. 10 defines signal levels to which symbols to be transmitted are mapped, on the basis of a difference in signal level from the previous signal level corresponding to the immediately preceding transmitted signal. More specifically, when a symbol "10" is transmitted, this symbol is mapped to a signal level that is larger than the previous signal level by one level, or a signal level smaller than the previous signal level by four levels. Similarly, a symbol "00" is mapped to a signal level that is larger than the previous signal level by two levels, or a signal level smaller than the previous signal level by three levels. A symbol "11" is mapped to a signal level that is larger than the previous signal level by three levels, or a signal level smaller than the previous signal level by two levels. A symbol "01" is mapped to a signal level that is larger than the previous signal level by four levels, or a signal level smaller than the previous signal level by one level.

Figure 11:
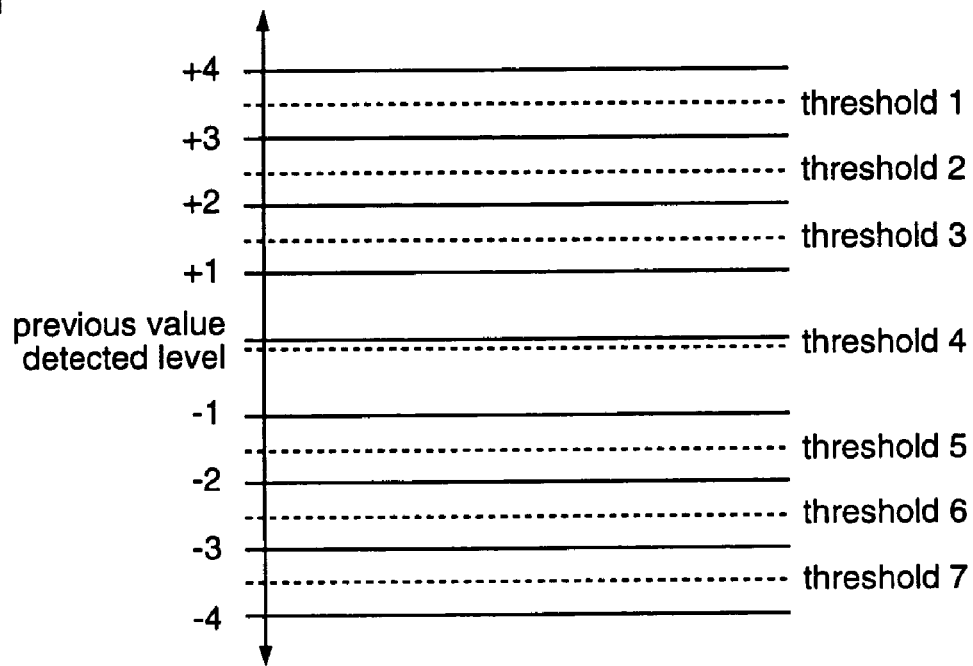
FIG. 11 is a diagram for explaining another example of the evaluation process by the evaluation unit according to the first embodiment.

When the signal level that has been coded on the basis of the difference in signal level is received to be decoded, the evaluation unit 250 detects a difference from the previous signal level corresponding to the immediately preceding received signal, thereby to obtain a symbol. More specifically, the previous signal level is stored, then a difference between the stored signal level and the received signal level is obtained, and the obtained difference is evaluated on the basis of thresholds 1 to 7 as shown in FIG. 11, thereby to assigning one of signal evaluation values "−4" to "+4" to the received signal. Then, the obtained signal evaluation value is transmitted to the decoding unit 260. The decoding unit 260 decodes the signal evaluation values "−4", "−3", "−2", "−1", "+1", "+2", "+3", and "+4" into symbols "01", "11", "00", "10", "01", "11", "00", and "10", respectively.

Thus, the symbol of the transmitted signal can be decided only on the basis of the difference in signal level from the previous signal, so that for example when the transmitting end 100 and the receiving end 200 have different potentials or the potentials vary, and even when the absolute voltage level cannot be detected on the transmitting end 100, the data can be correctly decoded by detecting the difference from the immediately preceding received signal level. Further, the transmitting end 100 always maps a symbol to a signal level other than the previous signal level and transmits the obtained symbol, so that the voltages constantly vary with symbol. Therefore, it is satisfactory that the receiving end 200 detects alternating components (the voltage fluctuation level), and when the potential difference between the transmitting end 100 and the receiving end 200 is quite large, a circuit for cutting off the alternating components can be provided in the receiving end. This is useful in circumstances where the transmitting end and the receiving end have different ground levels or where the voltage-resistant characteristics are demanded, such as in a case where the apparatus is mounted on a motor vehicle.

At the coding on the basis of the signal level difference, data which has been coded by the bi-phase mark method may be mapped to a signal level with referring to the conversion table shown in FIG. 10. When the data that has been coded by the bi-phase mark method is coded on the basis of the difference from the previous signal level, the distance between symbols is always two ore more levels, so that the evaluation is performed by setting a threshold at an intermediate signal level between respective possible symbols, thereby to realize the data receipt with higher precision.

Further, other than the coding of symbols with reference to the conversion table as shown in FIG. 10, another conversion table may be employed so long as symbols are mapped on the basis of a difference between the previous signal level and the next assumable signal level.

Figure 12:
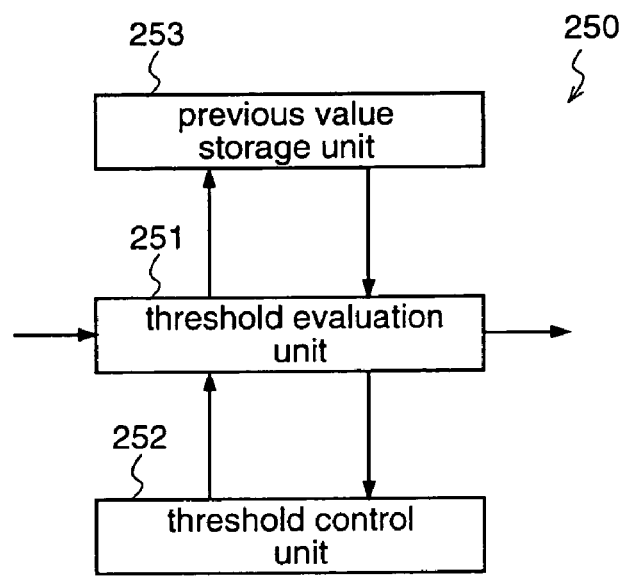
FIG. 12 is a block diagram illustrating another structure of the evaluation unit according to the first embodiment.

When a signal level that has been coded on the basis of the signal level difference is received and decoded, the evaluation unit 250 may be constructed as shown in FIG. 12. FIG. 12 is a block diagram illustrating another construction of the evaluation unit 250. This evaluation unit 250 includes a threshold evaluation unit 251 that holds a threshold and subjects a signal that has passed through the digital filter 240 to threshold evaluation, a threshold control unit 252 that controls the threshold, and a previous value storage unit 253 that stores the immediately preceding signal level.

The threshold evaluation unit 251 calculates a difference between the signal level of a signal that has passed through the digital filter 240 and the previous signal level that is stored in the previous value storage unit 253, and evaluates the obtained difference on the basis of thresholds 1 to 7 as shown in FIG. 11, thereby assigning one of signal evaluation values "−4" to "+4" to the signal. Then, the variation in the signal level (signal evaluation value) is transmitted to the decoding unit 260, as well as the present signal level is stored in the previous value storage unit 253, and the difference between the signal evaluation value (evaluation result) and the previous signal level is transmitted to the threshold control unit 252. Then, the threshold control unit 252 calculates differences corresponding to one fluctuation in the threshold, on the basis of the received difference and the signal evaluation value. That is, the average of differences in signal levels corresponding to one variation in the threshold, during past plural symbol timings is obtained, and the obtained average is transmitted to the threshold evaluation unit 251 as a threshold control signal. The average is obtained considering also that spaces between the thresholds 3 and 4, and the thresholds 4 and 5 are 1.5 times as large as spaces between other thresholds in the case of FIG. 11. Then, the threshold evaluation unit 251 changes the threshold in accordance with the threshold evaluation signal.

Thus, the threshold is modified on the basis of the evaluation result on the signals that have been received for a predetermined period. Accordingly, in cases where the transmitted voltage varies according to the change in the supply voltage or the like, correct data can be obtained by modifying the threshold.

In this embodiment, when modifying the threshold, the evaluation unit 250 obtains differences corresponding to one variation in the threshold to obtain an average. However, any value such as a value corresponding to the maximum amplitude may be obtained so long as this value enables to modify changes in the amplitude level in the signal waveform which has been transmitted from the transmitting end 100, and the threshold can be appropriately modified by averaging such values during a predetermined period.

In this embodiment, the modification of the threshold is performed after the processing by the digital filter is performed, while the threshold may be fixed and the received signal is amplified to change the amplitude into an appropriate level.

Further, in this embodiment, signal levels which are one more than the number of symbols are provided, then a signal level of a signal that was transmitted in the previous symbol timing is employed as a prohibit level, and the symbol is mapped to other signal level. However, the number of signal levels may be increased, thereby to increase the number of prohibit levels. For example, increase or decrease of the previous signal level with relative to a signal level that is antecedent to the previous signal level is stored and, when the signal level is dropping, signal levels which are lower than the previous signal level are prohibited in the next symbol timing. On the other hand, when the signal level is rising, signal levels which are higher than the previous signal level are prohibited. The signal waveform in this case constantly rises and drops repeatedly in each symbol timing, whereby a synchronization clock having a stable phase is generated on the receiving end.

In this embodiment, the descriptions have been given of the signal transmission according to the multi-valued baseband transmission, while emitted noises can be reduced in the same manner as in this embodiment also in cases where modulation such as ASK (amplitude shift keying) or 64QAM (Quadrature Amplitude Modulation) is performed. When the modulation is performed, signal bands are located on both sides of the modulation frequency, so that the frequency required for each symbol rate at the baseband transmission is reduced to half, whereby the limited band due to the characteristics of the twisted pair cable is effectively utilized, resulting in higher-speed transmission. Further, when the phase and amplitude are both subjected to the modulation like in 64QAM, more efficient transmission can be performed, thereby realizing a higher transmission rate also when the same twisted pair cable is employed.

Embodiment 2

A digital data transmission apparatus of the present invention, a transmission channel coding method, and a decoding method will be described as a second embodiment, with reference to the drawings.

Figure 13:
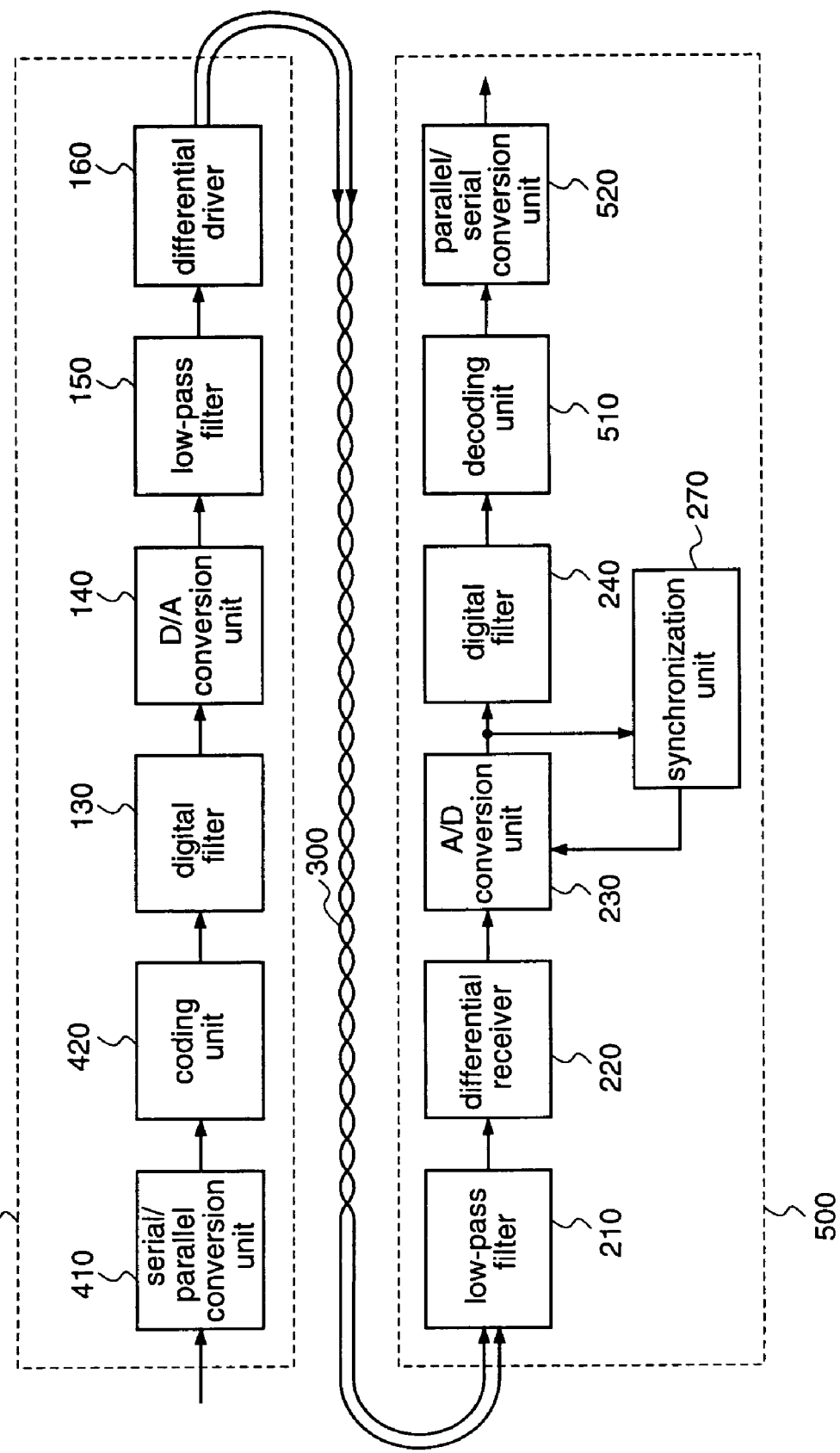
FIG. 13 is a block diagram illustrating a structure of a digital data transmission apparatus according to a second embodiment of the present invention.

FIG. 13 is a block diagram illustrating a digital data transmission apparatus according to the second embodiment of the present invention. In FIG. 13, the same or corresponding elements as those in FIG. 1 are denoted by the same reference numerals, and will not described in detail herein.

A transmitting end 400 of the digital data transmission apparatus according to the second embodiment consists of a serial-to-parallel conversion unit 410 for grouping a received data stream, 2 bits by 2 bits, to be converted into four-value symbols; a coding unit 420 for coding a symbol into any of eight-value signal levels; a digital filter 130 that allows a band of frequency components corresponding to half of the symbol rate to pass; a D/A conversion unit 140 for converting 2-bit data that has passed through the digital filter 130 into an analog signal; a low-pass filter 150 for eliminating a high-band signal from the analog signal; and a differential driver 160 for amplifying the signal that has passed through the low-pass filter so as to have sufficient signal strength to be transmitted to the twisted pair cable 300 (transmission channel) and differentially outputting the obtained signals.

On the other hand, the receiving end 500 consists of a low-pass filter 210 for eliminating noises outside of a signal band of a transmission signal from both wires of the twisted pair cable 300; a differential receiver 220 for receiving a signal that has passed through the low-pass filter 210; an A/D conversion unit 230 for converting the received signal into a digital signal; a digital filter 240 that allows only a predetermined frequency band to pass; a decoding unit 510 for evaluating a symbol represented by the level of the received signal; a parallel-to-serial conversion unit 520 for converting a symbol into 2-bit serial data; and a synchronization unit 270 for generating a clock that is employed at the A/D conversion of the received signal.

The operation of the digital data transmission apparatus that is constructed as described above will be described.

A digital signal to be transmitted through the transmitting end 400 is initially inputted to the serial/parallel conversion unit 410. The serial/parallel conversion unit 410 groups the received data stream, 2 bits by 2 bits, and converts the data into four-value symbols, i.e., "00", "01", "10", and "11", to be transmitted to the coding unit 420. The coding unit 420 maps the received signal into one of eight-value signal levels, i.e., "−7", "−5", "−3", "−1", "+1", "+3", "+5", and "+7", to be coded. Frequency components higher than half of the symbol rate, of the signal that has been converted into the signal level by the coding unit 420 are eliminated by the digital filter 130, and the obtained signal is converted into an analog signal by the D/A conversion unit 140. The obtained analog signal is a signal that includes a coded symbol at symbol timing of each symbol cycle. The high-band signal of the analog signal is eliminated by the low-pass filter 150, and the obtained signal is transmitted to the differential driver 160. Then, the differential driver 160 converts this signal into two signals having amplitudes which are proportional to the inputted signal and having opposite polarities relative to a reference potential, and differentially outputs the two signals to the twisted pair cable 300. The signals outputted from the differential drivers 160 have been coded so as to always take signal levels that are different from the previous signal levels, and the values of the signals constantly vary with symbol timing.

Then, on the receiving end 500, the transmission signals transmitted through both wires of the twisted pair cable 300 are passed through the low-pass filter 210 to eliminate noises outside a predetermined signal band, and the obtained signal is received by the differential receiver 220. Then, this signal is converted into a digital signal by the A/D conversion unit 230. Here, the synchronization unit 270 generates a synchronized sampling clock, utilizing the fact that values of the transmission signal are constantly increased or decreased with symbol cycles so that the A/D conversion unit 230 samples the signal in symbol timing, and then transmits the generated clock to the A/D conversion unit 230. Then, the A/D conversion unit 230 samples the received signal in symbol timing of the sampling clock generated by the synchronization unit 270, to be converted into a digital signal. The obtained digital signal is passed through the digital filter 240, to be converted into a signal that has no interference between adjacent codes and can be read in appropriate timing. The decoding unit 510 evaluates the signal level of the signal that has been obtained by the sampling in symbol timing to decide which symbol among "00", "01", "10", and "11" is represented by the signal level, thereby decoding the received signal into a symbol. The parallel/serial conversion unit 520 converts the received symbol into 2-bit serial data, and outputs the same sequence of digital signal as that of the digital signal inputted to the serial/parallel conversion unit 410 on the transmitting end 400.

Next, the coding unit 420 and the decoding unit 510 will be described.

The coding unit 420 is initially described.

Figures 14, 15:
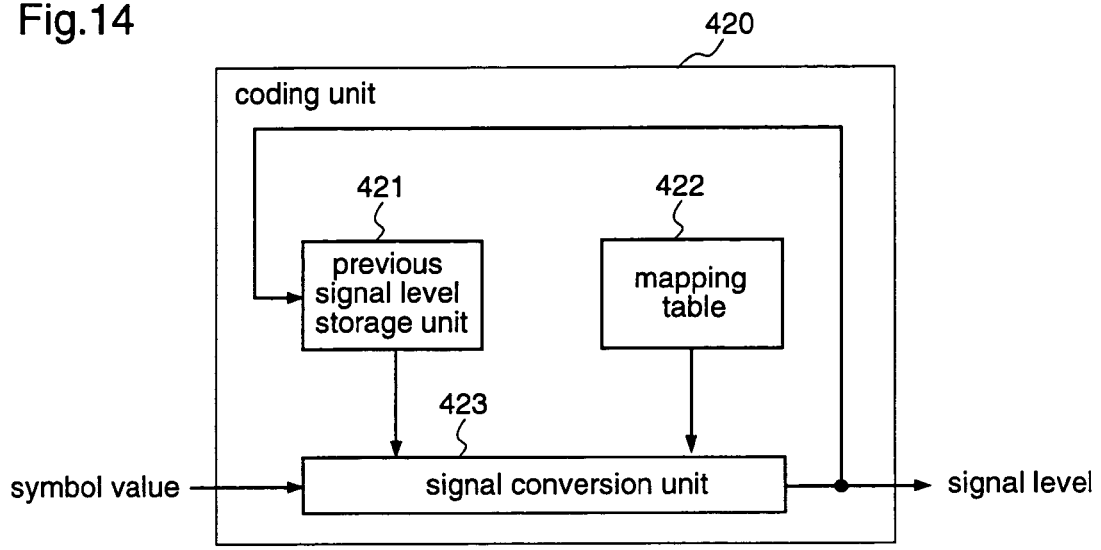
FIG. 14 is a block diagram illustrating a structure of a coding unit according to the second embodiment.
FIG. 15 is a diagram showing an example of a mapping table that is employed by the coding unit according to the second embodiment.

FIG. 14 is a block diagram illustrating a structure of the coding unit 420. As shown in FIG. 14, the coding unit 420 includes a previous signal level storage unit 421 that stores the previous signal level that was coded immediately before;

a mapping table 422 that defines signal levels to which the symbols to be transmitted, i.e., "01", "11", "00", and "10" are mapped on the basis of the previous signal level; and a signal conversion unit 423 for carrying out a coding process with referring to the mapping table 422, on the basis of the value that is stored in the previous signal level storage unit 421 and the signal inputted from the serial/parallel conversion unit 410. Here, the initial value of the previous signal level storage unit 421 may be any signal level so long as this signal level can be transmitted to the digital filter 130.

The mapping table 422 includes signal levels which are twice as many as the number of symbols, as specifically shown in FIG. 15. The symbols to be transmitted are mapped alternately to one of upper half signal levels and one of lower half signal levels in each symbol cycle, and the signal level to be transmitted is decided on the basis of the received symbol and the previous signal level. The signal conversion unit 423 decides the signal level to be transmitted with referring to the mapping table 422 on the basis of two values, i.e., the symbol that is received from the serial/parallel conversion unit 410 and the previous signal level that is stored in the previous signal level storage unit 421, and transmits the decided signal level to the digital filter 130. At the same time, the previous signal level storage unit 421 destroys the signal level that has been held, thereby to newly hold the signal level that has been received this time, for the coding in the next symbol timing.

Figure 17:
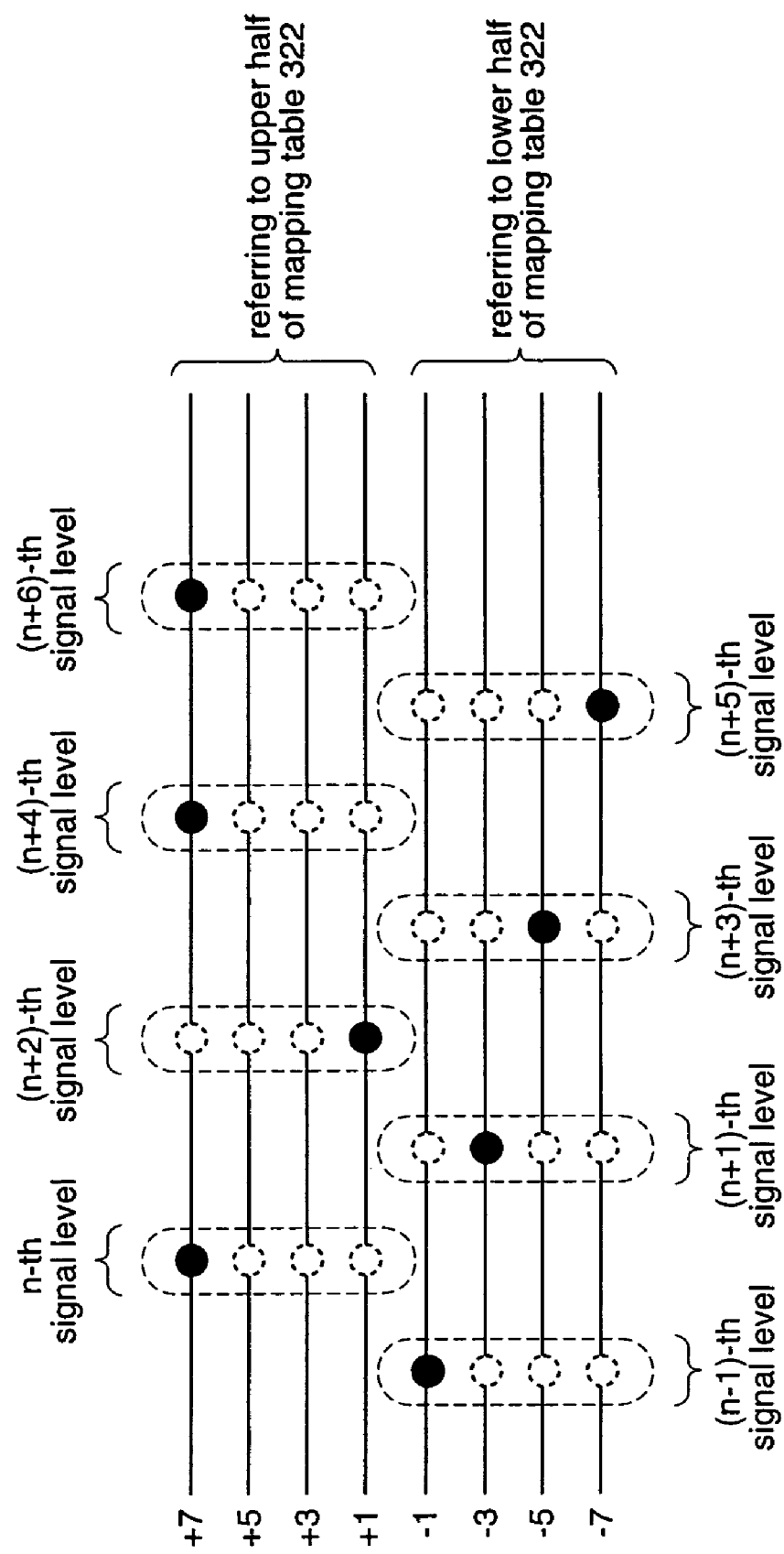
FIG. 17 is a diagram showing an example of a signal level that is obtained by the coding unit according to the second embodiment.

The above-mentioned operation will be specifically described with reference to an example in which symbols shown in FIG. 16 are received from the serial/parallel conversion unit 410. It is assumed that the signal level "−1" is stored in the previous signal level storage unit 421 at a time when n-th symbol "00" is received. When receiving the symbol, the signal conversion unit 423 refers to the mapping table 422, to decide a signal level to be transmitted at "+7", on the basis of two values, i.e., the received symbol "00" and the previous signal level "−1", and transmits the obtained signal level to the digital filter 130. At the same time, the previous signal level storage unit 421 changes the stored previous signal level to "+7". The signal conversion unit 423 receives (n+1)-th symbol "10" in the next symbol timing, and decides a signal level to be transmitted at "−3" with reference to the mapping table 422 on the basis of the received symbol "10" and the previous signal level "+7", to be transmitted to the digital filter 130. At the same time, the previous signal level storage unit 421 changes the stored the signal level to "−3". Thus, the signal conversion unit 423 decides the signal levels to be transmitted at "+1", "−5", "+7", "−7" and "+7", successively from the (n+2)-th received symbol, with reference to the mapping table 422. The signal levels transmitted to the digital filter 130 adaptively to the (n−1-th to (n+6)-th symbols are mapped alternately to the upper half signal levels and the lower half signal levels as shown in FIG. 17, and clock components are multiplexed thereto.

Next, the decoding unit 510 is described.

Figure 18:
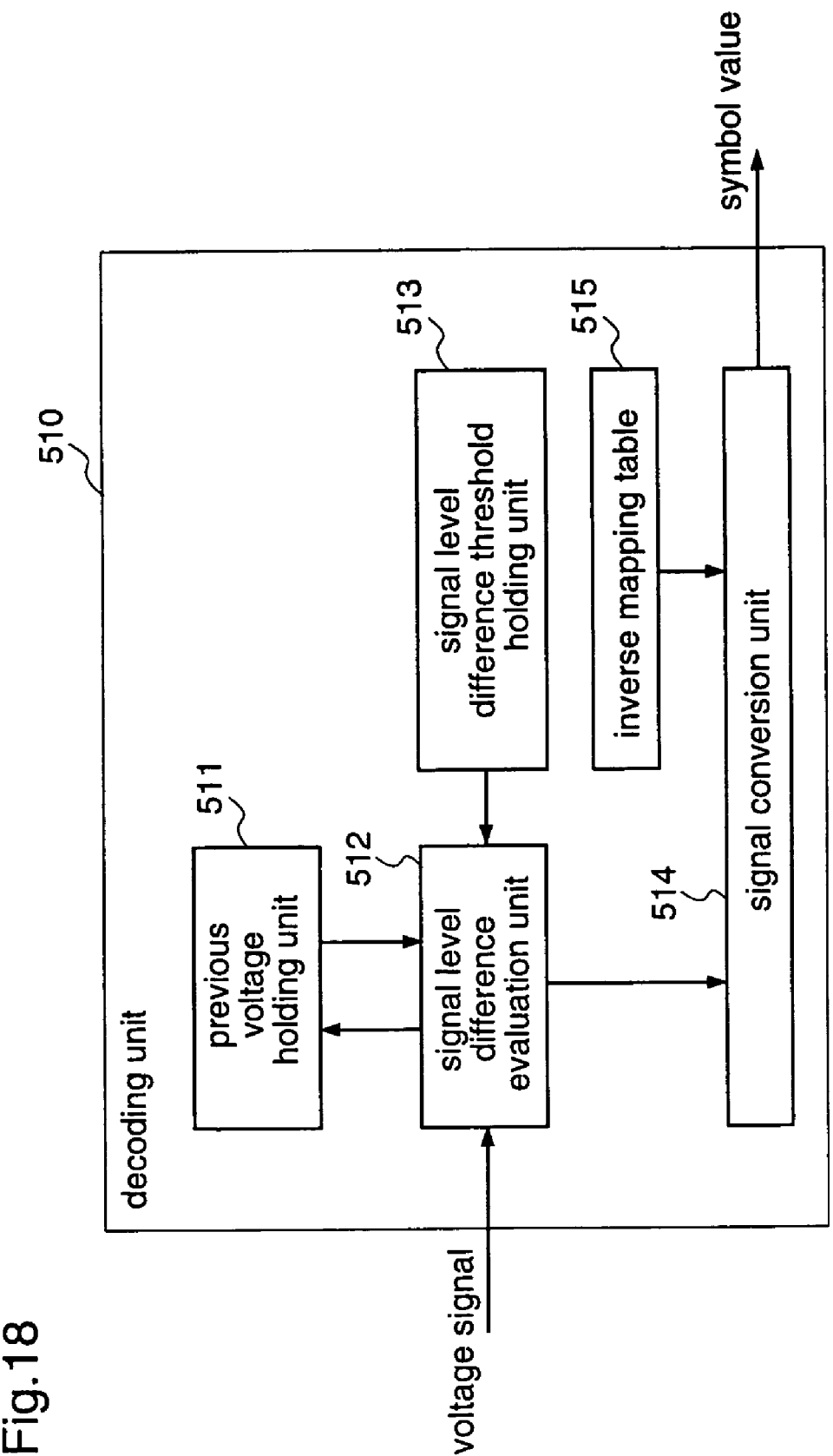
FIG. 18 is a block diagram illustrating a structure of a decoding unit according to the second embodiment.

FIG. 18 is a block diagram illustrating a structure of the decoding unit 510. As shown in FIG. 18, the decoding unit 510 includes a previous voltage holding unit 511 for holding a voltage corresponding to a signal level that was received in the previous symbol timing; a signal level difference evaluation unit 512 for evaluating a difference between the received signal level and the signal level that was received in the previous symbol timing; a signal level difference threshold holding unit 513 that holds a threshold for the evaluation of the signal level difference in the signal level difference evaluation unit 512; a signal conversion unit 514 for evaluating a symbol represented by the received signal level, thereby to be decoded; and an inverse mapping table 515 that is referred to by the signal conversion unit 514 at the decoding.

The signal level difference threshold holding unit 513 initializes or updates the held value in any timing.

An example of the method for initializing a value held by the signal level difference threshold holding unit 513 will be hereinafter described. Initially, the transmitting end 400 alternately transmits the signal mapped to the signal level "+7" and the signal mapped to the signal level "−7", and then the receiving end 500 receives the respective signals to obtain a difference of voltages corresponding to the levels of the received signals. The obtained difference is a difference in actual voltage in the case where the difference in signal level is ±7 levels. A threshold voltage is calculated on the basis of the difference in voltage to know the number of levels corresponding to change of the signal from the previous symbol timing in each symbol timing, and then each calculated value is held. For example, when the difference in signal level is ±28 in the case where the signal level varies by ±7 levels, a voltage corresponding to each threshold is calculated with assuming that the signal level varies by +7 levels when the voltage varies by +28. One calculation method in this example is:

$$(28/7)/2+(28/7) \times n \ (n=1, 2, 3, 4, 5, 6)-(28/7)/2-(28/7) \times n \ (n=1, 2, 3, 4, 5, 6)$$

Figure 19:
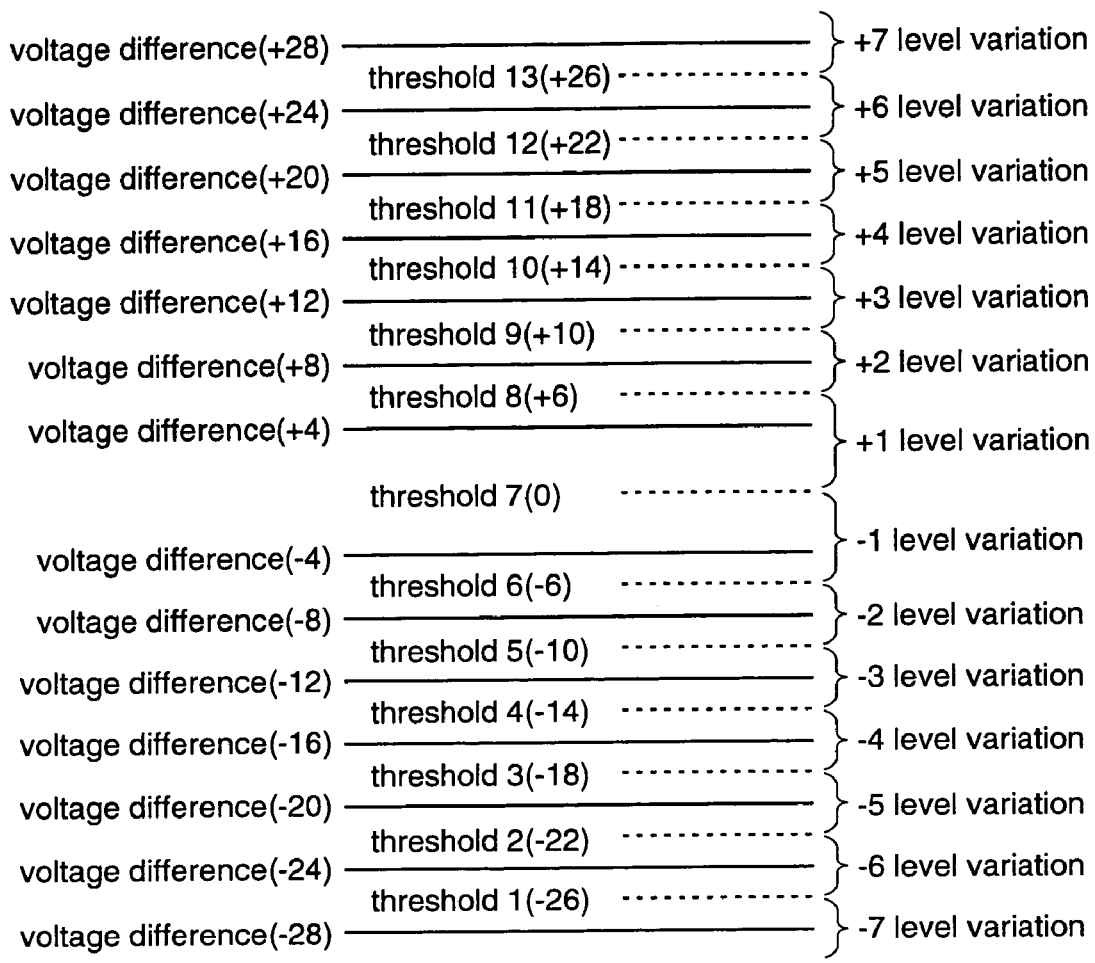
FIG. 19 is a diagram showing an example of the relationship between the difference in signal level and the threshold according to the second embodiment.

When the voltage corresponding to each threshold is calculated in this way, values as shown in FIG. 20 are held in the signal level difference threshold holding unit 512. Then, the difference between the signal level transmitted in the previous symbol timing and the signal level transmitted in the present symbol timing is obtained on the basis of the difference in voltage and the threshold, as shown in FIG. 19.

On the other hand, the update of the value held in the signal level difference threshold holding unit 513 is carried out in the following way: for example, the signal level of the received signal is evaluated in each symbol timing on the basis of the held threshold, then an error, i.e., a difference between the threshold voltage value that is presently held adaptively to the signal level and the voltage value corresponding to the signal level that is received in the present symbol timing is detected, and the threshold is modified on the basis of the detected error. In this second embodiment, the initialization and update in the signal level difference threshold holding unit 513 are carried out as described above, but any method may be employed so long as the threshold for evaluating the number of difference levels corresponding to a difference in voltage between the received signal level and the signal level in the previous symbol timing can be acquired.

The signal level difference evaluation unit 512 calculates a difference between the voltage of the received signal level and the voltage held in the previous voltage holding unit 511, and selects a threshold corresponding to the calculated difference from thresholds which are held in the signal level difference threshold holding unit 513. Then, the number of difference levels corresponding to the selected threshold is evaluated as shown in a table of FIG. 21, and then the number of difference levels is transmitted to the signal conversion unit 514. The signal conversion unit 514 evaluates a symbol represented by the received signal level, with reference to the inverse mapping table 515 on the basis of the signal level difference evaluated by the signal level difference evaluation unit 512. Here, the inverse mapping table 515 defines symbols corresponding to the numbers of difference levels, as specifically shown in FIG. 22. The obtained symbol is transmitted to the parallel/serial conversion unit 520 and the previous voltage holding unit 511.

When receiving a new signal level, the previous voltage holding unit 511 destroys the previous voltage that has been held, and holds the voltage corresponding to the received signal level to be updated.

Thus, the digital data transmission apparatus, and the transmission channel coding method and the decoding method according to the second embodiment provides signal levels which are twice as many as the number of symbols to be transmitted, and encodes a signal level that represents each symbol in each symbol timing, by being mapped to one of signal levels other than the signal level that was transmitted in the previous symbol timing. Therefore, the symbol can be converted into a signal level other than the previous signal level, whereby values of the signals outputted from the transmitting end constantly vary with symbol timing, and synchronization in symbol timing on the receiving end 500 can be readily established.

In addition, the symbol to be transmitted is alternately mapped to a lower half signal level and an upper half signal level in each symbol cycle, whereby the mapping in which the signal level is constantly increased or decreased in symbol timing can be performed. Consequently, the frequency components corresponding to half of the symbol rate are contained in the transmission signal to multiplex the clock components therein, whereby the reproduction synchronization can be readily established on the receiving end 500.

Further, when the signal is received, the difference in signal level from the previous signal can be calculated and simultaneously the symbol can be obtained, thereby realizing signal transmission with little delay.

The symbol information is included in the difference between the signal level received in the previous symbol timing and the signal level received in the present symbol timing. Thus, also when the absolute voltage level on the transmitting end 400 cannot be detected, for example, in cases where the transmitting end 400 and the receiving end 500 have different potentials or where the potentials vary, data can be transmitted correctly.

In this second embodiment, 2-bit data are subjected to the serial/parallel conversion to be converted into one symbol, and then the symbol is mapped to a signal level. However, also when data of 2 or more bits are subjected to the serial/parallel conversion to be converted into one symbol and then the symbol is mapped to a signal level, the same effect as described above is achieved.

While in this second embodiment four-value symbols are mapped to eight-value signal levels with referring to the mapping table at the coding, the same effect as described above is achieved also when four-value symbols are mapped to six-value signal levels as shown in FIG. 23. In this case, a mapping table as shown in FIG. 23 is employed as the mapping table 422 of the coding unit 420. The mapping table in FIG. 23 defines signal levels that are 1.5 times as many as the number of symbols. The symbols to be transmitted to are mapped alternately to one of signal levels which are as many as the number of kinds of the symbols beginning from the lowest signal level in even-numbered symbol cycles, and one of signal levels which are as many as the number of the kinds of the symbols beginning from the highest signal level in odd-numbered symbol cycles. Thus, the signal levels to be transmitted are decided on the basis of the received signal and the previous signal level.

In this second embodiment, the mapping table 422 as shown in FIG. 15 is employed at the coding, and the inverse mapping table as shown in FIG. 22 is employed at the decoding. However, not only the mapping table of FIG. 15 and the inverse mapping table of FIG. 22 are employed but any mapping table may be employed so long as the mapping table enables to multiplex the clock components so that the reproduction synchronization is readily established, and map the symbols to the differences between the previous signal level and the signal level to be transmitted.

In this second embodiment, the symbols are mapped to the difference between the previous signal level and the signal level to be transmitted, while the absolute value of the signal level, which is defined for each symbol, may be employed to map four symbols to eight signal levels as shown in FIG. 24. Further, four symbols can be mapped to six signal levels as shown in FIG. 25. In these cases, when the absolute voltage level on the transmitting end can be detected, the same effect as described in this second embodiment is achieved.

Embodiment 3

A digital data transmission apparatus and a transmission channel coding method will be described as a third embodiment of the present invention, with reference to the drawings.

Figure 26:
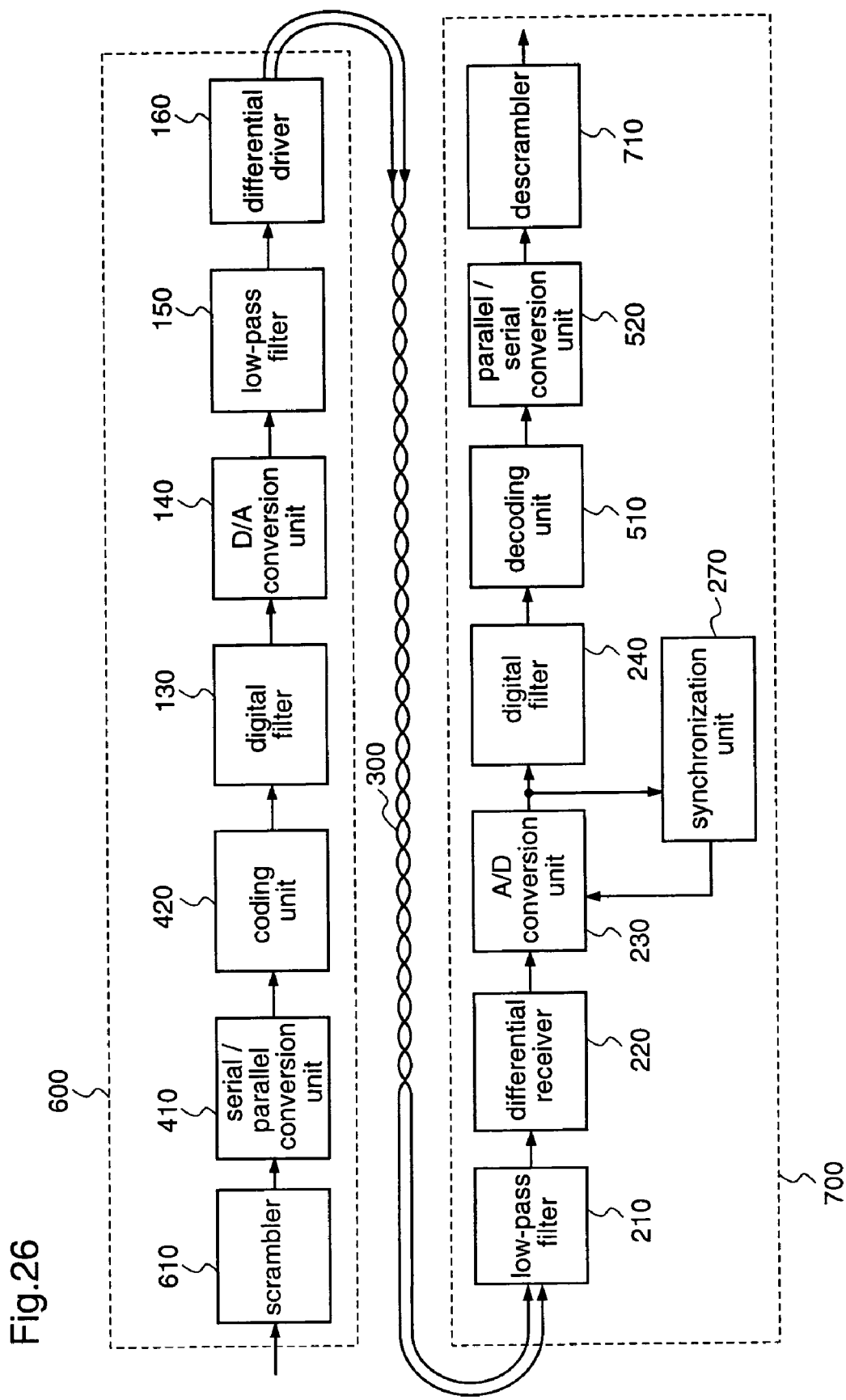
FIG. 26 is a block diagram illustrating a structure of a digital data transmission apparatus according to a third embodiment of the present invention.

FIG. 26 is a block diagram illustrating structures of a transmitting end 600 and a receiving end 700 according to the third embodiment. In this FIG. 26, the same or corresponding elements as those in FIG. 13 are denoted by the same reference numerals and will not described in detail herein.

The digital data transmission apparatus according to the third embodiment further includes a scrambler 610 for scrambling digital data to be transmitted and inputting the scrambled data to the serial/parallel conversion unit 410 in the transmitting end 400 according to the second embodiment, and a descrambler 710 for descrambling received data in the receiving end 500.

The operation of the digital data transmitting apparatus that is constructed as described above will be described.

Mapping on the transmitting end 600 according to the third embodiment is similar to the mapping on the transmitting end 400 according to the second embodiment. More specifically, the symbols are alternately mapped to signal levels which are as many as the number of kinds of the symbols starting from the lowest signal level, and signal levels which are as many as the number of kinds of the symbols starting from the highest signal level.

Figure 27:
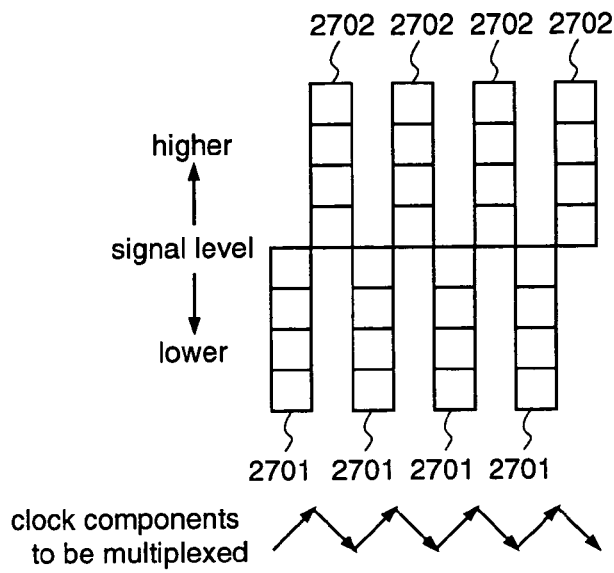
FIG. 27 is a diagram for explaining an example where clock components are multiplexed even when scrambling is not performed at the mapping according to the third embodiment.

FIG. 27 shows an example in which four-value symbols are mapped to eight-value signal levels. In FIG. 27, signal levels 2701 and 2702 show signal levels to which symbols may be mapped in each symbol cycle. When four-value symbols are mapped to eight-value signal levels, the symbols are always mapped so that one of lower four signal levels 2701 and one of upper four signal levels 2702 are alternately employed, thereby multiplexing clock components into a transmission signal with reliability. However, when the symbols are mapped to signal levels which are less than twice as many as the number of kinds of the symbols, there are some cases where the clock components cannot be multiplexed into the transmission signal.

Figure 28A:
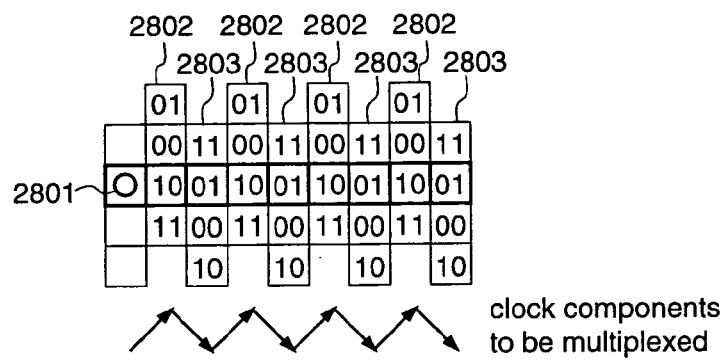
FIGS. 28(a) and 28(b) are diagrams for explaining an example where clock components are not multiplexed when scrambling is not performed at the mapping according to the third embodiment.
Figure 28B:
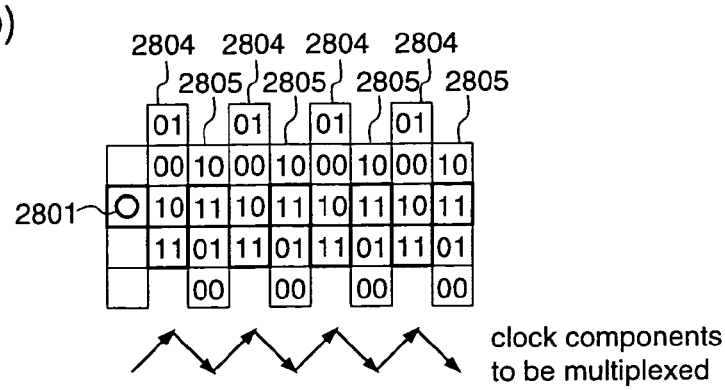

FIGS. 28(*a*) and 28(*b*) show cases where four-value symbols are mapped to five-value signal levels. In FIGS. 28(*a*) and 28(*b*), a signal level 2801 shows a signal level to which a symbol was mapped in the immediately preceding symbol cycle. Signal levels 2802 to 2805 show signal levels to which symbols may be mapped in the respective symbol cycles. In the cases where four-value symbols are mapped to five-value signal levels, when digital data to be transmitted includes repetition "1001" as shown in FIG. 28(*a*), the symbols are always mapped to the same signal level, and thus the clock components are not at all multiplexed into the transmission signal. When digital data to be transmitted includes succession of "1" as shown in FIG. 28(*b*), clock components having the reverse phase to the intended clock components will be multiplexed. When clock component are not multiplexed into a transmission signal like in these cases, synchronization of the clock cannot be established by the clock reproduction unit, whereby the A/D conversion unit 230 cannot sample the received signal, and thus the received signal may not be decoded.

According to the third embodiment, in order to prevent the impracticability of decoding of the received signal, the scrambling is performed to multiplex clock components into the transmission signal. To be more specific, an array of data to be transmitted is changed, as well as when the data array is "A, B, C, D, E, F, G, H", succession of "A=E", "B=F", "C=G", "D=H" is prevented.

Figure 29:
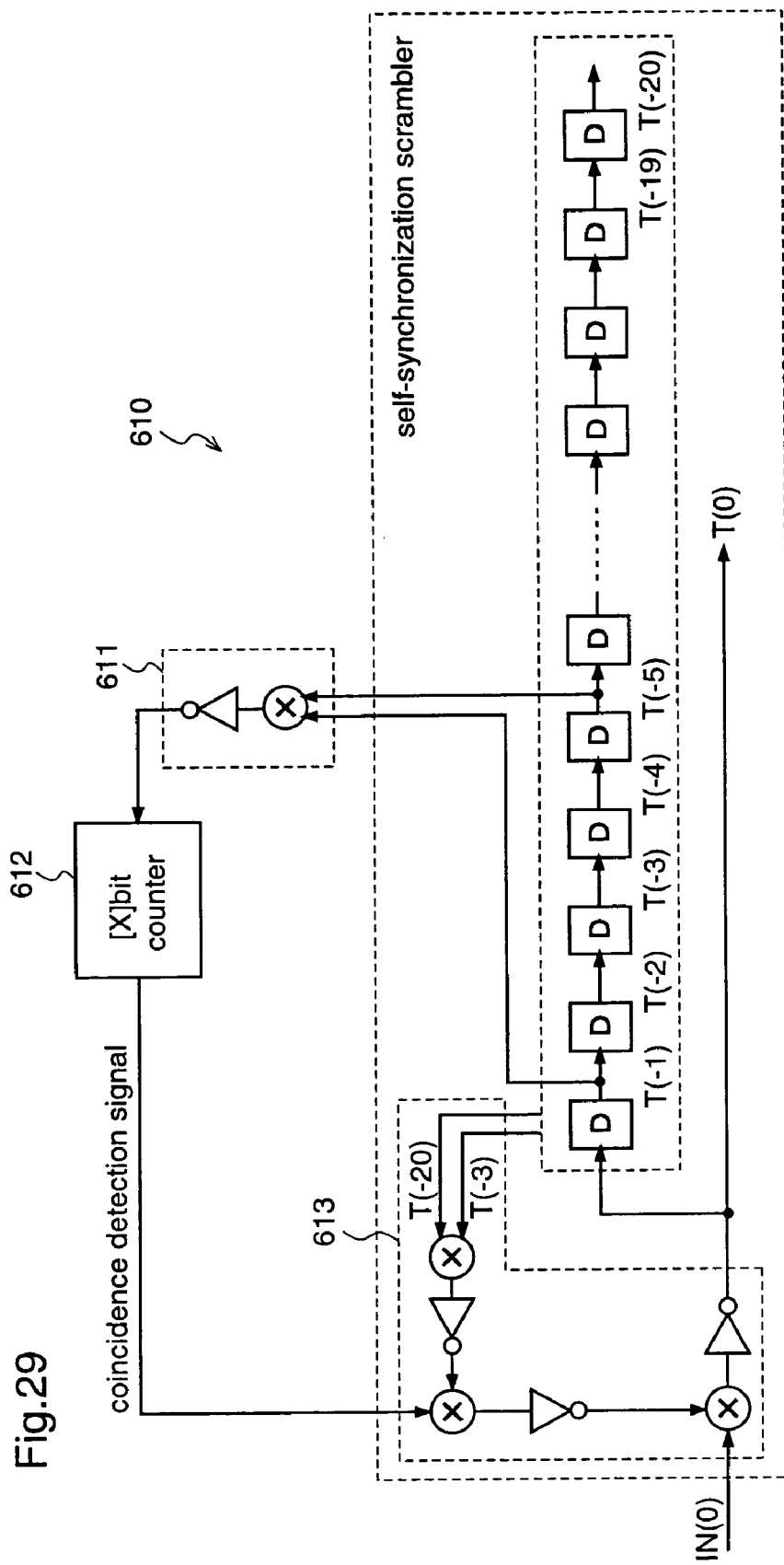
FIG. 29 is a block diagram illustrating a structure of a scrambler according to the third embodiment.

FIG. 29 illustrates a structure of the scrambler 610. The scrambler 610 multiplies digital data to be transmitted by data that is generated from the transmission data, thereby performing scrambling.

To be more specific, a first arithmetic unit 611 extracts predetermined data and data that is antecedent to the predetermined data by four bits, from a scrambled data stream, and detects whether these two pieces of data coincide with each other. When these two pieces of data coincide with each other, a [X]bit counter 612 is incremented by [1]. On the other hand, when these data do not coincide with each other, the value of the [X]bit counter 612 is set at [0]. Here, only when portions each including two pieces of data that coincide with each other successively appear and the [X]bit counter 612 becomes full (i.e., all bits are [1]), a coincidence detection signal is outputted to a second arithmetic unit 613. Then, the second arithmetic unit 613 carries out a Process A on the basis of data T(0) that is to be scrambled, data T(−3) that is antecedent to the data T(0) by 3 bits, and data T(−20) that is antecedent to the data T(0) by 20 bits:

$T(0)=INxorT(-3)xnorT(-20)$: (Process A).

In Process A, arithmetic is performed like in a process for inverting data when the coincidence signal is in a predetermined state, to change an array of the data to be transmitted, thereby performing scrambling.

Figure 30:
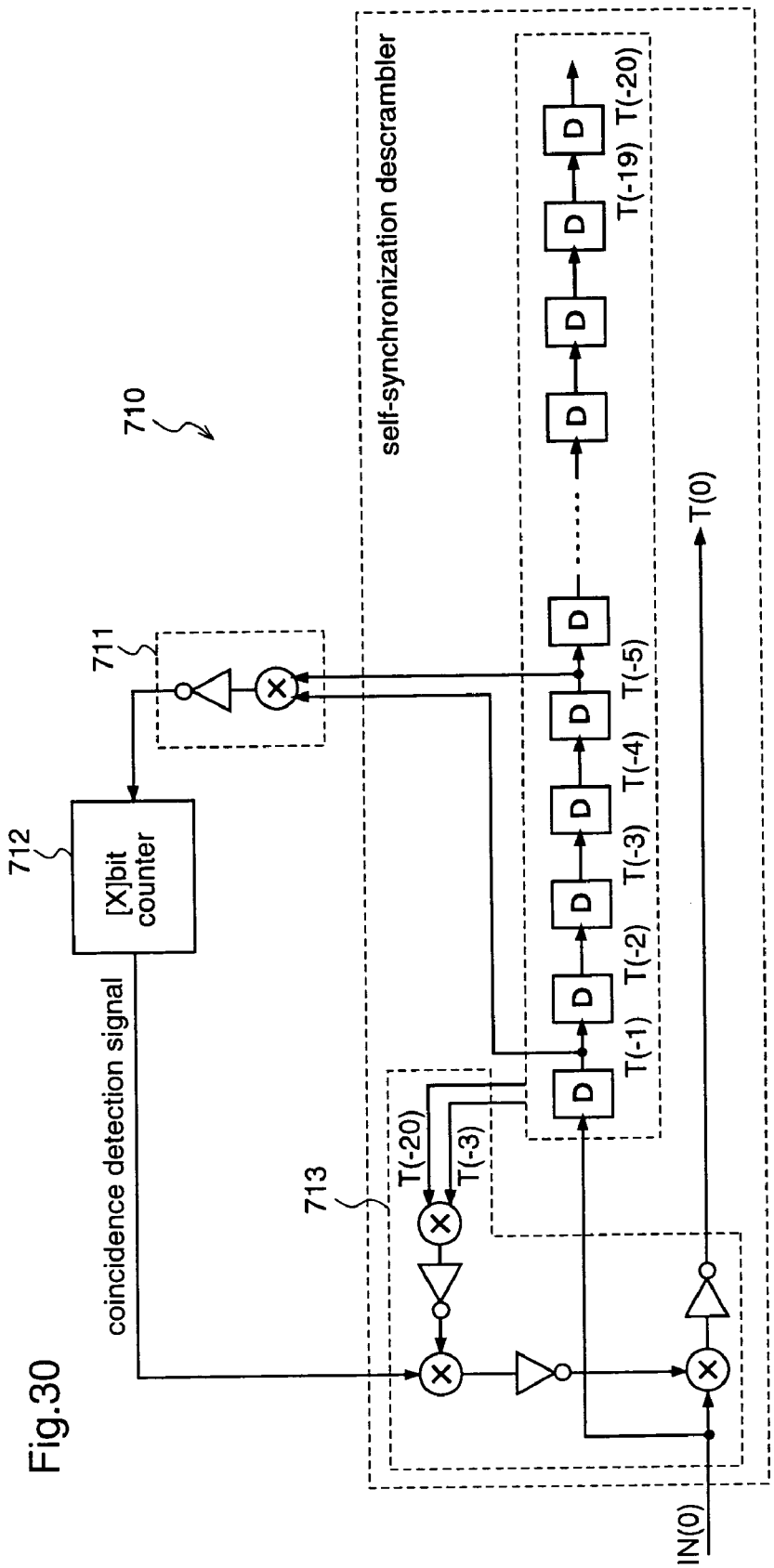
FIG. 30 is a block diagram illustrating a structure of a descrambler according to the third embodiment.

FIG. 30 illustrates a structure of a descrambler 710 for descrambling the data that has been scrambled as described above.

In this descrambler 710, like in the scrambler 610, a first arithmetic unit 711 extracts prescribed data and data that is antecedent to the prescribed data by 4 bits, from a descrambled data stream, and detects whether these two pieces of data coincide with each other. When these two pieces of data coincide with each other, a [X]bit counter 712 is incremented by [1]. On the other hand, when these data do not coincide with each other, the value of the [X]bit counter 712 is set at [0]. Here, only when portions each including two pieces of data that coincide with each other successively appear and the [X]bit counter 712 becomes full (i.e., all bits are [1]), a coincidence detection signal is outputted to a second arithmetic unit 713. The second arithmetic unit 713 carries out a Process A on the basis of data T(0) that is to be scrambled, data T(−3) that was processed 3 bits before, and data T(−20) that was processed 20 bits before:

$T(0)=INxorT(-3)xnorT(-20)$: (Process A).

In the Process A, arithmetic is performed like in a process for inverting data when the coincidence signal is in a prescribed state, thereby descrambling the received data.

According to the transmission channel coding method and the transmission and receiving ends of the third embodiment, the digital data to be transmitted is scrambled, whereby succession of the same value in the data to be transmitted can be prevented, and clock components can be multiplexed into the data to be transmitted.

In addition, data to be transmitted and data that is antecedent to the data by 4 bits are extracted from the data stream to be transmitted, and the data is inverted to be scrambled when portions each including the two pieces of data that coincide with each other successively appear, whereby the clock components can be multiplexed into the transmission signal with reliability. Further, the descrambling can be carried out without adjusting timing on the transmitting end and the receiving end, whereby any kind of data can be transmitted or received.

In this third embodiment, the scrambler 610 performs the operation on the basis of the data T(−3) that was processed 3 bits before, and the data T(−20) that was processed 20 bits before, while this embodiment is not limited to these data but the same effect is achieved also when any data are operated.

Similarly, in this third embodiment, the descrambler 710 performs the operation on the basis of the data T(−3) that was processed 3 bits before and the data T(−20) that was processed 20 bits before, while this embodiment is not limited to these data but the same effect is achieved also when any data are operated.

Embodiment 4

A digital data transmission/receiving apparatus of the present invention will be described as a fourth embodiment, with reference to the drawings.

Figure 31:
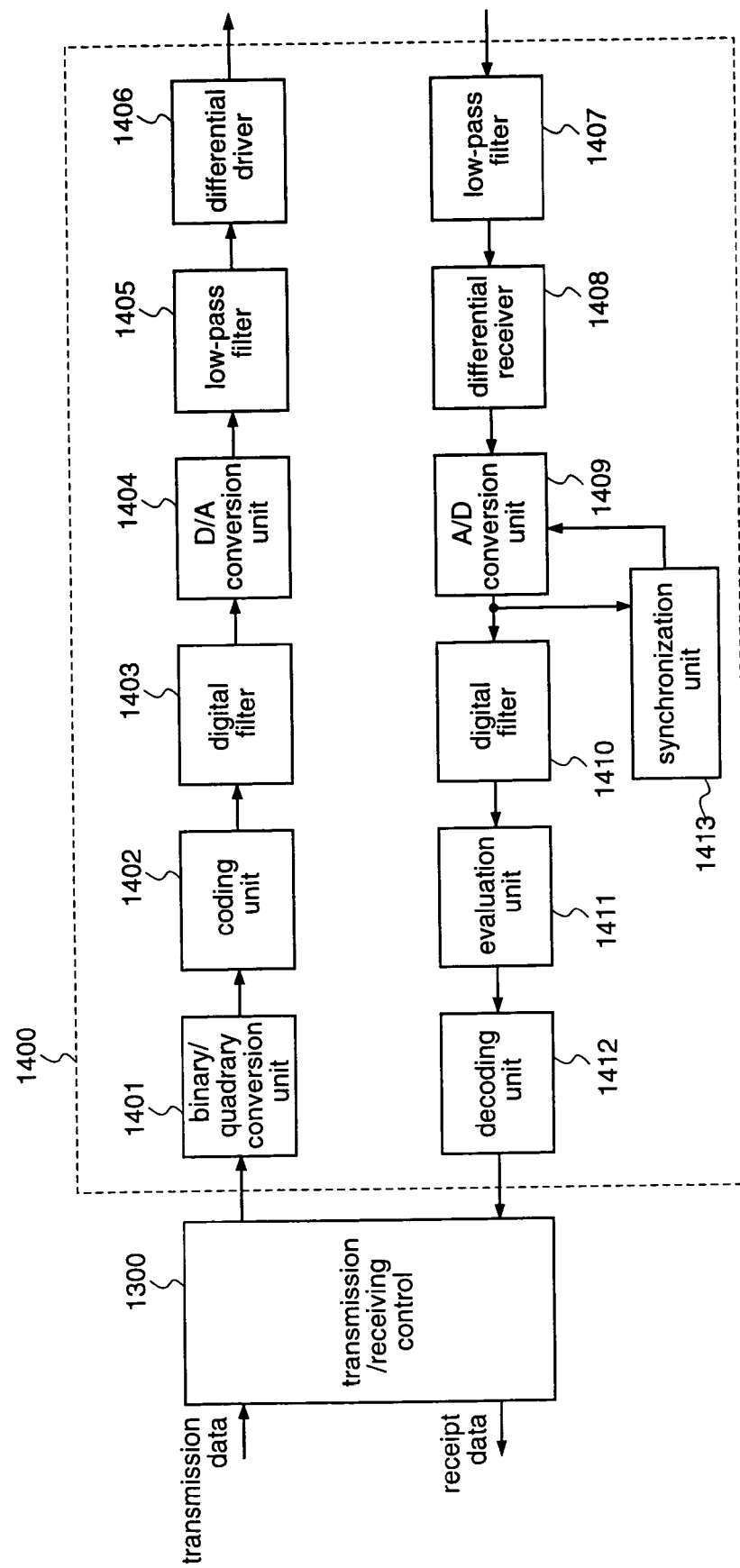
FIG. 31 is a block diagram illustrating a structure of a digital data transmission/receiving apparatus according to a fourth embodiment of the present invention.

FIG. 31 is a block diagram illustrating a structure of the digital data transmission/receiving apparatus according to the fourth embodiment.

As shown in FIG. 31, the digital data transmission/receiving apparatus according to the third embodiment consists of a transmission/receiving control unit 1300 for controlling transmission or receiving of data; and a data transmission/receiving unit 1400 for transmitting or receiving data.

The data transmission/receiving unit 1400 includes the transmitting end 100 and the receiving end 200 of the digital data transmission apparatus as shown in FIG. 1, which are not connected with each other. More specifically, the data transmission/receiving unit 1400 consists of a binary/quadrary conversion unit 1401; a coding unit 1402; a digital filter 1403; a D/A conversion unit 1404; a low-pass filter 1405; a driver 1406; a low-pass filter 1407; a receiver 1408; an A/D conversion unit 1409; a digital filter 1410; an evaluation unit 1411; a decoding unit 1412; and a synchronization unit 1413.

In the digital data transmission/receiving apparatus that is constructed as described above, the transmission/receiving control unit 1300 judges whether data that has been received by the data transmission/receiving unit 1400 is to be retransmitted, and inputs data that is to be retransmitted into the binary/quadrary conversion unit 1401 of the data transmission/receiving unit 1400, while outputting data that will not be retransmitted to the outside as received data. The transmission/receiving unit 1300 multiplexes transmission data that is inputted from the outside into the data to be retransmitted, to transmit the multiplexed data to the data transmission/receiving unit 1400, and the data transmission/receiving unit 1400 transmits the received data.

Figures 32, 33:
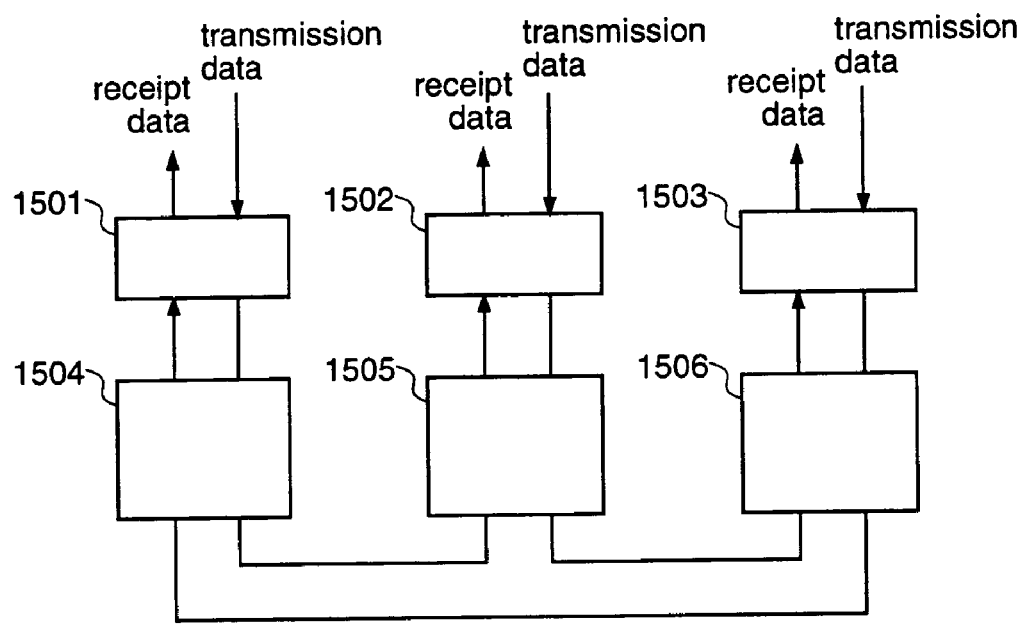
FIG. 32 is a diagram showing an example where a plurality of the digital data transmission/receiving apparatuses according to the fourth embodiment are connected via buses in the form of a ring.
FIG. 33 is a diagram for explaining a coding method according to a bi-phase mark method as a conventional transmission method.

FIG. 32 shows an example where a plurality of the digital data transmission/receiving apparatus are connected in the form of a ring via buses. In this figure, numerals 1501, 1502, and 1503 each denote a transmission/receiving control unit having the same construction as the transmission/receiving control unit 1300 in FIG. 31. Numerals 1504, 1505, and 1506 each denote a data transmission/receiving unit having the same construction as the data transmission/receiving unit 1400 in FIG. 31. These transmission/receiving units are connected so that transmission data that is transmitted from a data transmission/receiving unit in the previous stage is received by a data transmission unit in the next stage, and transmission data that is transmitted from a data transmission/receiving unit in the last stage is received by the data transmission/receiving unit in the first stage.

Each of the transmission/receiving control units 1501 to 1503 performs processing of upper communication layers, such as address management. Each of the data transmission/receiving units 1504 to 1506 exchanges data among the transmission/receiving control units 1501 to 1503.

With the above-mentioned construction, a data transmission/receiving section including buses in the form of a ring is obtained.

INDUSTRIAL AVAILABILITY

The present invention provides a digital data transmission apparatus, a transmission channel coding method, and a decoding method, by which digital data are converted into multi levels and coded so as not to take the same signal level successively, thereby realizing high-speed data transmission, as well as noise emission in a band of 30 MHz or lower is reduced by a digital filter up to the amount that is compliant with requirements for mounting on motor vehicles.

The invention claimed is:

1. A digital data transmission apparatus comprising:
   a data coding device operable to convert digital data into a signal level corresponding to a symbol that is assigned to the digital data in each symbol cycle as a prescribed unit cycle;
   a first digital filter having a first sampling cycle that is shorter than a unit cycle of a signal level string that has been obtained by said data coding device, and being operable to allow only predetermined frequencies to pass;
   a D/A converter operable to convert a digital data stream that has passed through said first digital filter, into an analog signal;
   a low-pass filter operable to eliminate folding distortion of said first digital filter from the analog signal that has been obtained by said D/A converter, the folding distortion being determined in the first sampling cycle;
   a differential driver operable to convert an output from said low-pass filter, into two signals having opposite polarities relative to a predetermined reference potential, and to input the two signals into a twisted pair cable;
   a differential receiver operable to receive transmission signals transmitted through the twisted pair cable, and to convert a difference in potential between two wires of the twisted pair cable into a signal;
   an A/D converter operable to convert the signal outputted from said differential receiver into a digital signal value in each second sampling cycle;
   a second digital filter operable to allow only a predetermined frequency band of a digital data stream that has been obtained by sampling with said A/D converter, to pass; and
   a level evaluator operable to evaluate a symbol value from a level of a signal in symbol timing, including a symbol in the signal, based on an output from said second digital filter, and to convert the symbol value into corresponding digital data,
   wherein said first and second digital filters both have low-pass characteristics, and said first digital filter has frequency characteristics of cutting off at least frequency data which are higher than a frequency band in which electromagnetic waves emitted from the respective two signals that pass through the twisted pair cable cancel each other out, thereby to eliminate emission of electromagnetic waves to outside the twisted pair cable.

2. The digital data transmission apparatus of claim 1, wherein said data coding device is operable to convert data comprising two or more bits per symbol cycle, into a symbol to be transmitted.

3. The digital data transmission apparatus of claim 2, wherein said data coding device has five signal levels, and is operable to assign a symbol in a symbol transmission timing to a signal level other than a previous signal level corresponding to a signal which was transmitted in an immediately preceding symbol transmission timing, in an order of 01, 11, 00, 10, starting from a lowest signal level.

4. The digital data transmission apparatus of claim 2, wherein digital data to be transmitted have been coded by a bi-phase mark method, and
   wherein said data coding device is operable to assign a symbol in a symbol transmission timing to a signal level other than a previous signal level corresponding to a signal which was transmitted in an immediately preceding symbol transmission timing, in an order of 01, 11, 00, 10, starting from a lowest signal level, thereby to decide a signal level to be transmitted.

5. The digital data transmission apparatus of claim 2, wherein said data coding device is operable to assign a symbol in a symbol transmission timing alternately to one of a number of signal levels which is as many as a number of kinds of symbols starting from a lowest signal level and to one of the number of signal levels which is as many as the number of kinds of the symbols starting from a highest signal level, thereby to decide a signal level to be transmitted.

6. The digital data transmission apparatus of any of claim 2, wherein said data coding device includes:
   a previous signal level storage device operable to store a previous signal level; and
   a coding device operable to decide a signal level corresponding to a symbol to be transmitted, based on the previous signal level and the symbol to be transmitted.

7. The digital data transmission apparatus of claim 6, wherein said coding device is operable to assign a symbol in a symbol transmission timing to a signal level having a predetermined difference from the previous signal level that is stored in the previous signal level storage device.

8. The digital data transmission apparatus of claim 2, wherein said data coding device is supplied with a transmission method instruction signal indicating whether the transmission signal has been coded by a bi-phase mark method.

9. The digital data transmission apparatus of claim 1, wherein transmission characteristics of a signal which has been passed through said first and second digital filters have roll-off characteristics.

10. The digital data transmission apparatus of claim 1, wherein said level evaluator includes:
   a signal level detector operable to detect a signal level in each symbol cycle; and
   a previous signal level storage device operable to store a previous signal level which was received in an immediately preceding symbol receipt timing, and
   wherein said level evaluator is operable to decode the signal level detected by said signal level detector, into a corresponding symbol, based on the previous signal level that is stored in said previous signal level storage device.

11. The digital data transmission apparatus of claim 10, wherein said level evaluator further includes:
   a threshold controller operable to correct an evaluation threshold level based on variation values in respective signal levels which were received during a predetermined time period; and
   a threshold evaluator operable to hold a threshold and to perform threshold evaluation to a difference in signal level between a signal level that is detected in symbol timing and the previous signal level, thereby to decode a symbol value.

12. The digital data transmission apparatus of claim 10, wherein said level evaluator further includes a synchronization device operable to establish synchronization with a symbol cycle of a received signal, and
   wherein said synchronization device is operable to extract frequency components having a half cycle as long as the symbol cycle, from the received signal, and to control a symbol timing at which a symbol is detected, based on a phase of the extracted signal.

13. The digital data transmission apparatus of claim 10, wherein said level evaluator is supplied with a transmission method instruction signal indicating whether the received signal has been coded by the bi-phase mark method.

14. The digital data transmission apparatus of claim 1, wherein said level evaluator includes:
   a threshold controller operable to correct an evaluation threshold level based on variation values in respective signal levels which were received during a predetermined time period;
   a previous signal level storage device operable to store a previous signal level; and
   a threshold evaluator operable to hold a threshold and to perform threshold evaluation to a difference in signal level between a signal level that is detected in symbol timing and the previous signal level, thereby to decode a symbol value.

15. The digital data transmission apparatus of claim 1, further comprising:
   a scrambler operable to scramble digital data to be transmitted; and
   a descrambler operable to descramble received scrambled digital data.

16. The digital data transmission apparatus of claim 1, wherein said data coding device includes a number of signal levels which is greater than a number of kinds of symbols to be transmitted per symbol cycle, and is operable to assign a symbol in a symbol transmission timing to one of the signal levels.

17. The digital data transmission apparatus of claim 16, wherein said data coding device has five signal levels, and is operable to assign a symbol in a symbol transmission timing to a signal level other than a previous signal level corresponding to a signal which was transmitted in an immediately preceding symbol transmission timing, in an order of 01, 11, 00, 10, starting from a lowest signal level.

18. The digital data transmission apparatus of claim 16, wherein digital data to be transmitted have been coded by a bi-phase mark method, and
   wherein said data coding device is operable to assign a symbol in a symbol transmission timing to a signal level other than a previous signal level corresponding to a signal which was transmitted in an immediately preceding symbol transmission timing, in an order of 01, 11, 00, 10 starting from a lowest signal level, thereby to decide a signal level to be transmitted.

19. The digital data transmission apparatus of claim 16, wherein said data coding device is operable to assign a symbol in a symbol transmission timing alternately to one of a number of signal levels which is as many as a number of kinds of symbols starting from a lowest signal level and to one of the number of signal levels which is as many as the number of kinds of the symbols starting from a highest signal level, thereby to decide a signal level to be transmitted.

20. The digital data transmission apparatus of claim 16, wherein said data coding device further includes:
   a previous signal level storage device operable to store a previous signal level; and
   a coding device operable to decide a signal level corresponding to a symbol to be transmitted, based on the previous signal level and the symbol to be transmitted.

21. The digital data transmission apparatus of claim 20, wherein said coding device is operable to assign a symbol in a symbol transmission timing to a signal level having a predetermined difference from the previous signal level that is stored in the previous signal level storage device.

22. The digital data transmission apparatus of claim 16, wherein said data coding device is supplied with a transmission method instruction signal indicating whether the transmission signal has been coded by a bi-phase mark method.

23. A transmission channel coding method comprising:
   when transmitting digital data as one symbol having of an arbitrary number of bits, providing a number of signal levels which is greater than a number of kinds of symbols; and
   assigning a signal level that represents a symbol in a symbol transmission timing to one of the signal levels other than a previous signal level in an immediately preceding symbol transmission timing.

24. The transmission channel coding method of claim 23, wherein the number of kinds of the symbols is four, and two-bit data is transmitted per symbol.

25. The transmission channel coding method of claim 23, wherein 2-bit data are coded per one symbol by being assigned to signal levels in an order of 01, 11, 00, 10, starting from a lowest signal level.

26. The transmission channel coding method of claim 23, wherein the signal level that represents the symbol in the symbol transmission timing is assigned to a signal level having a predetermined difference from the previous signal level.

27. The transmission channel coding method of claim 23, wherein the number of the signal levels is one more than the number of kinds of symbols.

28. The transmission channel coding method of claim 23, wherein the number of the signal levels is twice as many as the number of kinds of the symbols.

29. The transmission channel coding method of claim 23, wherein the signal level that represents the symbol in the transmission timing is assigned alternately to one of the number of signal levels which is as many as the number of kinds of the symbols starting from a lowest signal level, and one of the number of signal levels which is as many as the number of kinds of the symbols starting from a highest signal level.

30. The transmission channel coding method of claim 29, wherein the number of kinds of the symbols is four, and two-bit data is transmitted per symbol.

31. The transmission channel coding method of claim 29, wherein 2-bit data are coded per one symbol by being assigned to signal levels in an order of 01, 11, 00, 10, starting from a lowest signal level.

32. The transmission channel coding method of claim 29, wherein the signal level that represents the symbol in the symbol transmission timing is assigned to a signal level having a predetermined difference from the previous signal level.

33. The transmission channel coding method of claim 29, wherein the number of the signal levels is one more than the number of kinds of symbols.

34. The transmission channel coding method of claim 29, wherein the number of the signal levels is twice as many as the number of kinds of the symbols.

35. The transmission channel coding method of claim 29, wherein the number of the signal level is 1.5 times as many as the number of kinds of the symbols.

36. The transmission channel coding method of claims 23, wherein the number of the signal level is 1.5 times as many as the number of kinds of the symbols.

37. A data transmission apparatus comprising:
a data coding device operable to convert digital data into a signal level corresponding to a symbol that is assigned to the digital data in each symbol cycle as a prescribed unit cycle;
a first digital filter having a first sampling cycle that is shorter than a unit cycle of a signal level string which has been coded by said data coding device, and being operable to allow only predetermined frequencies to pass;
a D/A converter operable to convert a digital data stream that has passed through said first digital filter, into an analog signal;
a low-pass filter operable to eliminate folding distortion of said first digital filter from the analog signal that has been obtained by said D/A converter, the folding distortion being determined in the first sampling cycle; and
a differential driver operable to convert an output of said low-pass filter, into two signals having opposite polarities relative to a predetermined reference potential, and to input the two signals into a twisted pair cable,
wherein said first digital filter has frequency characteristics of cutting off at least frequency data which are higher than a frequency band in which electromagnetic waves emitted from the respective two signals that pass through the twisted pair cable cancel each other out, thereby to eliminate emission of electromagnetic waves to outside the twisted pair cable.

38. A data receiving apparatus for receiving transmission signals that are transmitted from a data transmission apparatus including: a data coding device operable to convert digital data into a signal level corresponding to a symbol that is assigned to the digital data in each symbol cycle as a prescribed unit cycle; a first digital filter having a first sampling cycle that is shorter than a unit cycle of a signal level string that has been obtained by the data coding device, and being operable to allow only predetermined frequencies to pass; a D/A converter operable to convert a digital data stream that has passed through the first digital filter, into an analog signal; a low-pass filter operable to eliminate folding distortion of the first digital filter from the analog signal that has been obtained by the D/A converter, the folding distortion being determined in the first sampling cycle; a differential driver operable to convert an output from the low-pass filter, into two signals having opposite polarities relative to a predetermined reference potential, and to input the two signals into a twisted pair cable, wherein the first digital filter has low-pass characteristics of cutting off at least frequency data which are higher than a frequency band in which electromagnetic waves emitted from the respective two signals that pass through the twisted pair cable cancel each other out, thereby to eliminate emission of electromagnetic waves to outside the twisted pair cable, the data receiving apparatus comprising:
a differential receiver operable to receive transmission signals transmitted through the twisted pair cable, and to convert a difference in potential between two wires of the twisted pair cable into a signal;
an A/D converter operable to convert the signal outputted from said differential receiver into a digital signal value in each sampling cycle;
a second digital filter operable to allow only lower frequency components of a digital data stream that has been obtained by sampling with said A/D converter, to pass; and
a level evaluator operable to evaluate a symbol value from a level of a signal in symbol timing, including a symbol in the signal, based on an output from said second digital filter, and to convert the symbol value into corresponding digital data.

39. A data transmission/receiving apparatus for receiving data outputted from a data transmission apparatus including: a data coding device operable to convert digital data into a signal level corresponding to a symbol that is assigned to the digital data in each symbol cycle as a prescribed unit cycle; a first digital filter having a first sampling cycle that is shorter than a unit cycle of a signal level string that has been obtained by the data coding device, and being operable to allow only predetermined frequencies to pass; a D/A converter operable to convert a digital data stream that has passed through the first digital filter, into an analog signal; a low-pass filter operable to eliminate folding distortion of the first digital filter from the analog signal that has been obtained by the D/A converter, the folding distortion being determined in the first sampling cycle; a differential driver operable to convert an output from the low-pass filter, into two signals having opposite polarities relative to a predetermined reference potential, and to input the two signals into a twisted pair cable; a differential receiver operable to receive transmission signals transmitted through the twisted pair cable, and to convert a difference in potential between two wires of the twisted pair cable into a signal; an A/D converter operable to convert the signal outputted from the differential receiver into a digital signal value in each second sampling cycle; a second digital filter operable to allow only a predetermined frequency band of a digital data stream that has been obtained by sampling with the A/D converter, to pass; and a level evaluator operable to evaluate a symbol value from a level of a signal in symbol timing, including a symbol in the signal, based on an output from the second digital filter, and to convert the symbol value into corresponding digital data, wherein the first and second digital filters both have low-pass characteristics, and the first digital filter has frequency characteristics of cutting off at least frequency data which are higher than a frequency band in which electromagnetic waves emitted from the respective two signals that pass through the twisted pair cable cancel each other out, thereby to eliminate emission of electromagnetic waves to outside the twisted pair cable, the data transmission/receiving apparatus comprising:

a transmission/receiving controller operable to judge whether the digital data outputted from the level evaluator of the data transmission apparatus is to be retransmitted, output the digital data that is not to be retransmitted as received data, and multiplex transmission data inputted from outside with the digital data that is to be retransmitted, thereby to be inputted to the data coding device.

40. A signal processing method for processing transmission signals that are transmitted from a data transmission apparatus including: a data coding device operable to convert digital data into a signal level corresponding to a symbol that is assigned to the digital data in each symbol cycle as a prescribed unit cycle; a first digital filter having a first sampling cycle that is shorter than a unit cycle of a signal level string that has been obtained by the data coding device, and being operable to allow only predetermined frequencies to pass; a D/A converter operable to convert a digital data stream that has passed through the first digital filter, into an analog signal; a low-pass filter operable to eliminate folding distortion of the first digital filter from the analog signal that has been obtained by the D/A converter, the folding distortion being determined in the first sampling cycle; a differential driver operable to convert an output from the low-pass filter, into two signals having opposite polarities relative to a predetermined reference potential, and to input the two signals into a twisted pair cable, wherein the first digital filter has frequency characteristics of cutting off at least frequency data which are higher than a frequency band in which electromagnetic waves emitted from the respective two signals that pass through the twisted pair cable cancel each other out, thereby to eliminate emission of electromagnetic waves to outside the twisted pair cable, the data coding device is operable to convert data comprising two or more bits per symbol cycle, into a symbol to be transmitted, the data coding device includes: a previous signal level storage device operable to store a previous signal level; and a coding device operable to decide a signal level corresponding to a symbol to be transmitted, based on the previous signal level and the symbol to be transmitted, the coding device is operable to assign a symbol in a symbol transmission timing to a signal level having a predetermined difference from the previous signal level that is stored in the previous signal level storage device, the signal processing method comprising:

obtaining a difference between a signal level in a first symbol receipt timing and a signal level in a second symbol receipt timing; and establishing a symbol to correspond to the difference to decode a signal level in the first symbol receipt timing.

41. The signal processing method of claim 40, wherein the second symbol receipt timing corresponds to a symbol that is received prior to a symbol of the first symbol receipt timing.

42. A signal processing method for processing transmission signals that are transmitted from a data transmission apparatus including: a data coding device operable to convert digital data into a signal level corresponding to a symbol that is assigned to the digital data in each symbol cycle as a prescribed unit cycle; a first digital filter having a first sampling cycle that is shorter than a unit cycle of a signal level string that has been obtained by the data coding device, and being operable to allow only predetermined frequencies to pass; a D/A converter operable to convert a digital data stream that has passed through the first digital filter, into an analog signal; a low-pass filter operable to eliminate folding distortion of the first digital filter from the analog signal that has been obtained by the D/A converter, the folding distortion being determined in the first sampling cycle; a differential driver operable to convert an output from the low-pass filter, into two signals having opposite polarities relative to a predetermined reference potential, and to input the two signals into a twisted pair cable, wherein the first digital filter has low-pass characteristics of cutting off at least frequency data which are higher than a frequency band in which electromagnetic waves emitted from the respective two signals that pass through the twisted pair cable cancel each other out, thereby to eliminate emission of electromagnetic waves to outside the twisted pair cable, the data coding device includes a number of signal levels which is greater than a number of kinds of symbols to be transmitted per symbol cycle, the data coding device is operable to assign a symbol in a symbol transmission timing to one of the signal levels, the data coding device includes: a previous signal level storage device operable to store a previous signal level; and a coding device operable to decide a signal level corresponding to a symbol to be transmitted, based on the previous signal level and the symbol to be transmitted, the coding device is operable to assign a symbol in a symbol transmission timing to a signal level having a predetermined difference from the previous signal level that is stored in the previous signal level storage device, the signal processing method comprising:

obtaining a difference between a signal level in a first symbol receipt timing and a signal level in a second symbol receipt timing; and establishing a symbol to correspond to the difference to decode a signal level in the first symbol receipt timing.

43. The signal processing method of claim 42, wherein the second symbol receipt timing corresponds to a symbol that is received prior to a symbol of the first symbol receipt timing.

* * * * *